US011005941B2

(12) United States Patent
Chun et al.

(10) Patent No.: US 11,005,941 B2
(45) Date of Patent: May 11, 2021

(54) SENSOR MANAGEMENT METHOD AND DEVICE

(71) Applicant: SAMSUNG ELECTRONICS CO., LTD., Suwon-si (KR)

(72) Inventors: Hae-In Chun, Suwon-si (KR); Seong-Hwan Oh, Yongin-si (KR); Dae-Eun Yi, Seoul (KR); Sung-Do Choi, Suwon-si (KR); Yang-Wook Kim, Hwaseong-si (KR); In-Hak Na, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 218 days.

(21) Appl. No.: 16/068,857

(22) PCT Filed: Jan. 9, 2017

(86) PCT No.: PCT/KR2017/000288
§ 371 (c)(1),
(2) Date: Jul. 9, 2018

(87) PCT Pub. No.: WO2017/119800
PCT Pub. Date: Jul. 13, 2017

(65) Prior Publication Data
US 2019/0020721 A1 Jan. 17, 2019

(30) Foreign Application Priority Data
Jan. 8, 2016 (KR) ........................ 10-2016-0002668

(51) Int. Cl.
G06K 9/32 (2006.01)
H04L 29/08 (2006.01)
(Continued)

(52) U.S. Cl.
CPC .............. *H04L 67/125* (2013.01); *G06T 7/75* (2017.01); *G08B 25/08* (2013.01); *G08B 29/145* (2013.01);
(Continued)

(58) Field of Classification Search
CPC .... H04L 67/125; H04W 4/50; H04W 2/0023; H04W 4/38; H04W 12/00522;
(Continued)

(56) References Cited

U.S. PATENT DOCUMENTS

| 7,035,760 B2 | 4/2006 | Kobayashi et al. |
| 7,259,778 B2 | 8/2007 | Arpa et al. |

(Continued)

OTHER PUBLICATIONS

Search Report dated Apr. 4, 2017, issued by the International Searching Authority in International Application No. PCT/KR2017/000288 (PCT/ISA/210) English translation.
(Continued)

*Primary Examiner* — Samir A Ahmed
(74) *Attorney, Agent, or Firm* — Sughrue Mion, PLLC

(57) ABSTRACT

The present invention relates to a communication technique, which is a convergence of IoT technology and 5G communication system for supporting higher data transmission rate beyond 4G system, and a system for same. The present invention can be applied to smart services (e.g. smart homes, smart buildings, smart cities, smart cars or connected cars, health care, digital education, retail businesses, security- and safety-related services and the like) on the basis of 5G communication technology and IoT-related technology. A sensor management terminal, provided in an embodiment of the present invention, comprises the steps of: generating a constituent image of a space in which a sensor is installed; obtaining a sensor identifier of the sensor on the basis of the constituent image; obtaining the sensor information of the sensor corresponding to the sensor identifier; determining a
(Continued)

detection area of the sensor on the basis of the constituent image and sensor information; and displaying the determined detection area on the constituent image.

18 Claims, 19 Drawing Sheets

(51) Int. Cl.
*G06T 7/73* (2017.01)
*G08B 29/14* (2006.01)
*H04W 4/50* (2018.01)
*G08B 25/08* (2006.01)
*G08B 29/20* (2006.01)
*H04W 4/38* (2018.01)
*H04W 12/30* (2021.01)
*H04W 12/65* (2021.01)
*H04W 12/77* (2021.01)

(52) U.S. Cl.
CPC .............. *G08B 29/20* (2013.01); *H04W 4/38* (2018.02); *H04W 4/50* (2018.02); *H04W 12/35* (2021.01); *H04W 12/65* (2021.01); *H04W 12/77* (2021.01)

(58) Field of Classification Search
CPC . H04W 12/00504; G08B 25/08; G08B 29/20; G08B 29/145; G06T 7/75
See application file for complete search history.

(56) References Cited

U.S. PATENT DOCUMENTS

| | | | |
|---|---|---|---|
| 8,049,666 B2 | 11/2011 | Doh et al. | |
| 9,019,273 B2 | 4/2015 | Bai et al. | |
| 2005/0002662 A1* | 1/2005 | Arpa ..................... | H04N 7/181 396/120 |
| 2008/0080441 A1* | 4/2008 | Park ..................... | H04W 64/00 370/338 |
| 2009/0009339 A1 | 1/2009 | Gorrell et al. | |
| 2009/0153402 A1* | 6/2009 | Doh ..................... | G01S 5/02 342/450 |
| 2010/0245085 A1* | 9/2010 | Mochizuki ........... | G06Q 10/087 340/540 |
| 2013/0260783 A1 | 10/2013 | Agrawal et al. | |
| 2013/0311140 A1* | 11/2013 | Schechter ............... | H04W 4/50 702/188 |
| 2014/0025680 A1* | 1/2014 | Moganti ................. | G06F 16/48 707/737 |
| 2014/0313202 A1 | 10/2014 | Bai et al. | |
| 2014/0358468 A1 | 12/2014 | Kim et al. | |
| 2015/0123815 A1* | 5/2015 | Mejegard ............... | G06Q 10/06 340/870.07 |
| 2016/0285416 A1* | 9/2016 | Tiwari ................... | G06Q 10/06 |

OTHER PUBLICATIONS

Written Opinion dated Apr. 4, 2017, issued by the International Searching Authority in International Application No. PCT/KR2017/000288 (PCT/ISA/237).

* cited by examiner

| | 301 | 303 |
|---|---|---|
| IMAGE | ⊙ | ▭ |
| SENSOR TYPE | ILLUMINATION SENSOR | TEMPERATURE SENSOR |
| SENSOR MODEL NAME | L943kde23 | T249256d |

FIG.3

FIG. 4A

SENSOR INFORMATION (X)

| DETECTED OBJECT | POSITION | range | ANGLE | SENSOR TYPE | INFLUENCE FUNCTION PER DISTANCE {f(x)} |
|---|---|---|---|---|---|
| SENSOR1 | ZONE A, 18TH FLOOR (240, 302, 100) | 12m | - | TEMPERATURE SENSOR | $\alpha/x$ |
| SENSOR2 | ZONE B, 18TH FLOOR (310, 350, 100) | 20m | - | HUMIDITY SENSOR | $\beta/x$ |
| SENSOR3 | ZONE C, 18TH FLOOR (430, 403, 100) | 10m | 100 DEGREES | ILLUMINATION SENSOR | $\gamma/x$ |
| ... | | | | | |

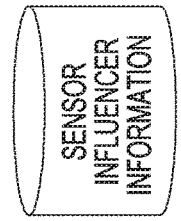

FIG. 4B

SENSOR INFLUENCER INFORMATION (Y)

| DETECTED OBJECT | TEMPERATURE | HUMIDITY | ILLUMINANCE | $CO_2$ | GAS/FIRE | HUMAN DETECTION |
|---|---|---|---|---|---|---|
| FAN HEATER | 0.8 | 0.9 | 0.0 | 0.7 | 0.8 | 0.0 |
| TV | 0.2 | 0.2 | 0.5 | 0.0 | 0.0 | 0.0 |
| FAN | 0.8 | 0.9 | 0.0 | 0.7 | 0.0 | 0.5 |
| GAS STOVE | 0.1 | 0.1 | 0.1 | 0.8 | 0.7 | 0.0 |
| REFRIGERATOR | 0.3 | 0.1 | 0.0 | 0.0 | 0.0 | 0.0 |
| COMPUTER | 0.2 | 0.1 | 0.1 | 0.0 | 0.0 | 0.0 |

SENSOR MANAGEMENT METHOD AND DEVICE

CROSS-REFERENCE TO RELATED APPLICATION

This application is a National Phase Entry of PCT International Application No. PCT/KR2017/000288, which was filed on Jan. 9, 2017, and claims priority to Korean Patent Application No. 10-2016-0002668, which was filed on Jan. 8, 2016, the contents of which are incorporated herein by reference.

BACKGROUND

1. Field

The present disclosure relates to a method and a device for managing a sensor.

2. Description of Related Art

The Internet has evolved from a human-centered connection network, in which humans create and consume information, into an Internet of Things (IoT) network, in which distributed components, such as objects, may exchange and process information. For example, in the Internet of Everything (IoE) technology, big-data processing technology is combined with the IoT through connection with a cloud server and the like.

As technological elements, such as sensing technology, wired/wireless communication and network infrastructure, service interface technology, and security technology, are required to implement IoT, technologies for sensor networks, Machine-To-Machine (M2M) communication, and Machine-Type Communication (MTC) have been studied for connection between objects.

In an IoT environment, an intelligent Internet Technology (IT) service that collects and analyzes data generated from connected objects may be provided to create new value in human life. The IoT is applicable to the fields of a smart home, a smart building, a smart city, a smart car or connected car, a smart grid, health care, a smart home appliance, advanced medical care services, and the like through convergence and integration of existing IT technology with various industries.

A smart building refers to a building that provides high-technology service functions via organic integration of architecture, communication, office automation, and building automation systems in order to achieve economic feasibility, efficiency, comfortability, functionality, reliability, and safety or refers to a high-functionality up-to-date building in which automated air conditioning/heating, lighting, and power systems of the building, an automatic fire detection device, security, an information and communication network, and office automation to improve business efficiency and environments are integrated into a home network. In order to realize such a smart building, various sensors, such as an environment management sensor and a security sensor for automatically detecting various environmental changes are installed in a building. The environment management sensor may include, for example, a temperature sensor, a humidity sensor, an illumination sensor, a smoke sensor, and the like. The security sensor may include, for example, a human detection sensor that detects a human presence.

When sensors are installed in a certain space in a building, the sensors need to be installed to detect every nook and corner. To this end, a position where the sensors are installed is determined in consideration of the structure of the space and equipment or objects installed in the space. For example, when installing a plurality of smoke sensors for fire detection in a large office, a position where the smoke sensors are installed is determined in consideration of the structure of the office and equipment or objects installed in the office, for example, a partition, a desk, a computer, a fan heater, and an air conditioner, in order to detect produced smoke in the entire office. After the sensors are installed in view of the structure of the space, when additional equipment is installed in the space or the previously installed equipment is repositioned, the detection area of the currently installed smoke sensors will be changed. Accordingly, the smoke sensors are installed at first such that there is no blind spot where the smoke sensors cannot detect produced smoke, but the added or changed equipment may cause a blind spot where the currently installed smoke sensors cannot detect produced smoke. When a fire occurs in the blind spot, the outbreak of the fire cannot be detected immediately, and smoke is detected only when the smoke spreads to the detection area other than the blind spot, so that the fire may not be detected in a short time.

SUMMARY

Therefore, when the configuration of a space where a sensor is installed is changed, for example, by changing the spatial structure of the space or by changing or adding equipment facilities, it is necessary to reposition the sensor or to install an additional sensor in view of the changed configuration of the space.

The present disclosure provides a method and a device for a terminal to determine the detection area of a sensor.

The present disclosure provides a method and a device for a terminal to identify a sensor so that the terminal determines the detection area of the sensor.

The present disclosure provides a method and a device for a terminal to obtain sensor information including the detection range of a sensor.

The present disclosure provides a method and a device for a terminal to obtain information on an object affecting the detection area of a sensor.

The present disclosure provides a method and a device for a terminal to determine an optimal position for a sensor when adding the sensor.

A method for managing a sensor in a terminal according to an embodiment of the present disclosure includes: generating a constituent image of a space in which the sensor is installed; obtaining a sensor identifier of the sensor on the basis of the constituent image; obtaining sensor information on the sensor corresponding to the sensor identifier; determining a detection area of the sensor on the basis of the constituent image and the sensor information; and displaying the determined detection area on the constituent image.

A terminal for managing a sensor according to an embodiment of the present disclosure includes: a control unit configured to generate a constituent image of a space in which the sensor is installed, to obtain a sensor identifier of the sensor on the basis of the constituent image, to obtain sensor information on the sensor corresponding to the sensor identifier, and to determine a detection area of the sensor on the basis of the constituent image and the sensor information; and an output unit configured to display the determined detection area on the constituent image.

BRIEF DESCRIPTION OF THE DRAWINGS

FIG. 3 is a diagram illustrating an example of a mapping table per sensor;

FIG. 4 is a diagram illustrating an example of sensor information and sensor influencer information according to an embodiment of the present disclosure;

DETAILED DESCRIPTION

Figure 1:
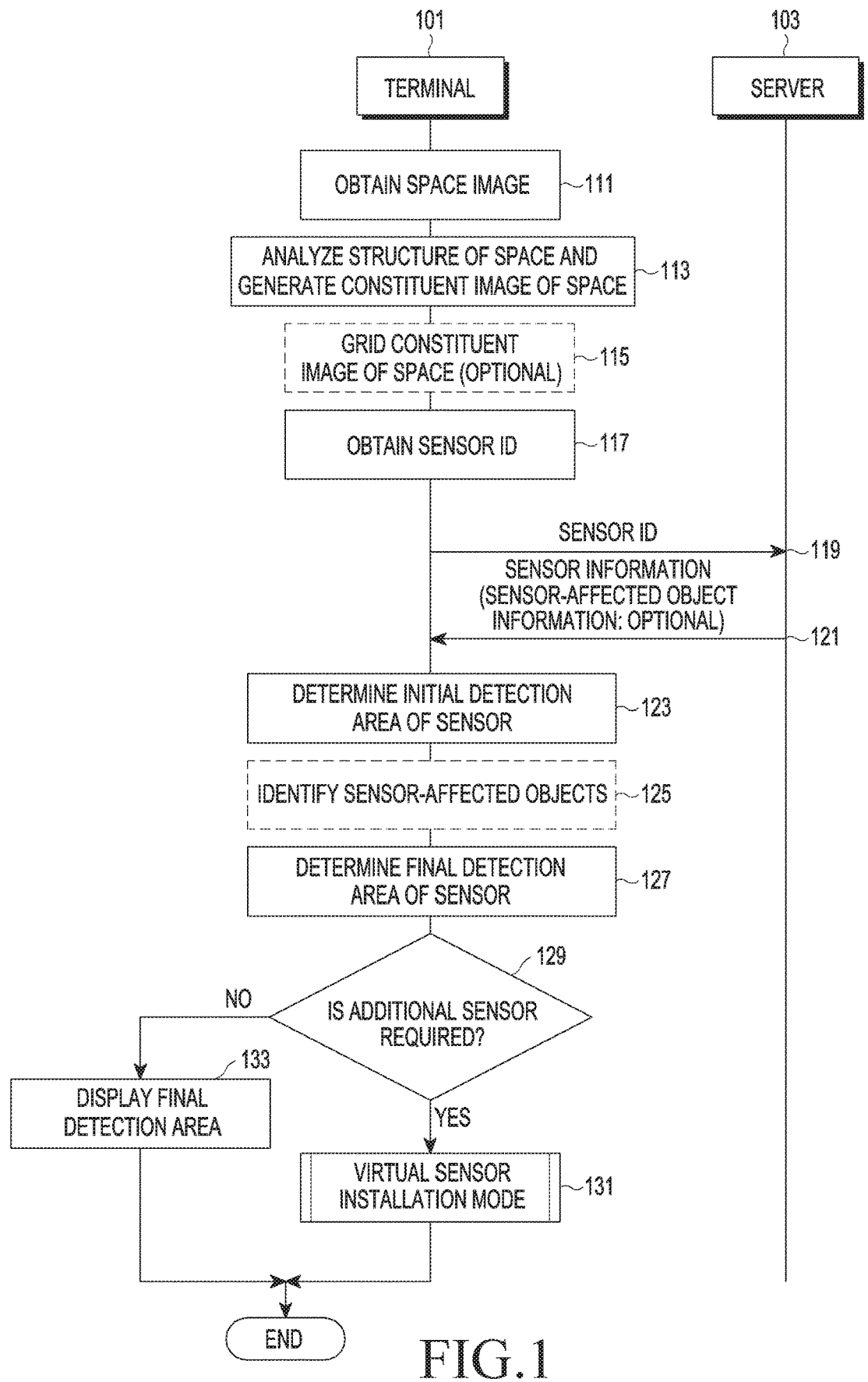
FIG. 1 is a diagram illustrating a method for determining a sensor detection area according to an embodiment of the present disclosure.

In the following description of the present disclosure, a detailed description of known configurations or functions incorporated herein will be omitted when it is determined that the detailed description may make the subject matter of the present disclosure unclear. Hereinafter, embodiments of the present disclosure will be described in detail with reference to the accompanying drawings.

Although embodiments of the present disclosure described below will be divided for the convenience of description, two or more embodiments may be combined within the range where the embodiments do not collide each other.

Meanwhile, terms described later are defined in consideration of the functions of the present disclosure, but the meaning of the terms may be changed according to a user, intention of an operator, or convention. Therefore, the definitions of the terms should be made based on the contents throughout the specification.

The present disclosure may have various modifications and various embodiments, among which specific embodiments will now be described more fully with reference to the accompanying drawings. However, it should be understood that there is no intent to limit the present disclosure to the particular forms disclosed, but on the contrary, the present disclosure is to cover all modifications, equivalents, and alternatives falling within the spirit and scope of the disclosure.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present specification, terms such as "include" or "have" are construed to denote the existence of a characteristic, number, step, operation, constituent element, component, or a combination thereof, but may not be construed to exclude the existence of or the possibility of addition of one or more other characteristics, numbers, steps, operations, constituent elements, components, or combinations thereof.

An apparatus and a method provided by an embodiment of the present disclosure can be applied to various communication systems, such as a Long Term Evolution (LTE) mobile communication system, a LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system of 3rd Generation Project Partnership 2 (3GPP2), a Wideband Code Division Multiple Access (WCDMA) mobile communication system 3GPP2, a Code Division Multiple Access (CDMA) mobile communication system of 3GPP2, Institute of an Electrical and Electronics Engineer (EEEE) 802.16m communication system, an Evolved Packet System (EPS), a Mobile Internet Protocol (Mobile IP) system and the like.

Prior to a detailed description of embodiments of the present disclosure, key concepts of the present disclosure are described in brief.

The fundamental concept of the present disclosure is to identify a sensor from an image of a space where the sensor is installed, to determine a detection area of the identified sensor, and to display the detection area in the image of the space in order to automatically control an environment of an indoor space. When it is determined that an additional sensor is required on the basis of the detection area of the sensor, an optimal position for the additional sensor to be installed is determined in consideration of the impact of surrounding objects.

Key terms used in the present specification are briefly described.

A "terminal" includes a device, for example, a computer and a smart phone which include a user input interface, such as a keyboard, a touch screen, and a mouse, and a user output interface, such as a display, and is capable of performing wired and/or wireless communication. The wireless communication includes, but is not limited to, cellular mobile communication, Wi-Fi, Device-to-Device (D2D) communication, Bluetooth, and Near Field Communication (NFC).

A "sensor" is a component, an instrument, or a measurer that detects, identifies, and measures a physical quantity or a change in physical quantity relating to heat, light, temperature, pressure, sound, humidity, illumination intensity, and presence in a human body, and indicates the physical quantity or change as a signal.

"Sensor information" includes detailed information on a sensor, such as the sensor identifier (ID) of the sensor, the installation position of the sensor, the sensing distance, the sensing angle, the sensor type, and an influence function per distance that indicates influence degree on a detection area according to the distance from the sensor.

An "object" refers to equipment or an item installed in a space. For example, an object refers to an item having a form, such as a partition, a desk, a computer, a fan heater, an air conditioner, a printer, and a water purifier in an office space.

A "sensor influencer" refers to an object that affects the sensitivity of a sensor.

"Sensor influencer information" includes sensor influencer list information and influence degree information that indicates the extent to which a sensor influencer affects the detection area of a sensor.

A "space (spatial) structure" refers to the structure of a space by the structure of a building itself, such as a wall and a pillar in a space, and system structures of various systems installed in the space, for example, a partition, a desk, a computer, an office machine, a cooler, and a heater. Accordingly, a "space (spatial) constituent image" refers to an image of the structure of a space including the structure of a building itself and a system structure.

The following embodiments of the present disclosure are described on the assumption that any sensor is installed in any space inside a building. However, such an assumption is present only for convenience of explanation, and a sensor is not necessarily installed inside the building, and therefore the present disclosure can be applied to any space outside a building.

Hereinafter, embodiments of the present disclosure will be described in detail.

FIG. 1 is a diagram illustrating a method for determining a sensor detection area according to an embodiment of the present disclosure. If necessary, an operation in FIG. 1 will be illustrated in detail in FIGS. 2A to 2G. FIGS. 2A to 2G are one connected view but are shown separately considering the limit of space. FIGS. 2A to 2G are diagrams illustrating an example of an operation for displaying a sensor detection area according to an embodiment of the present disclosure.

In operation 111, a terminal 101 obtains an image of a space in which a sensor is installed. The image of the space may be a two-dimensional image, a three-dimensional image including depth information, or a thermal image captured using a camera device of the terminal 101 or the like. For reference, a three-dimensional image may be generated by scanning a space using a camera device, such as a Red-Green-Blue (RGB) camera, a TOF depth camera, and a motion tracking camera, and a positional acceleration sensor, such as a gyroscope and a compass sensor. In addition, the image of the space is generally a video captured while the terminal 101 is moving in the space. However, the image of the space may be a video or at least one still image captured while the terminal 101 is rotating at a stationary position.

In operation 113, a space structure is analyzed using the image of the space, and a constituent image of the space is generated on the basis of this analysis.

The constituent image of the space may be generated on the basis of at least one of location information on the terminal and the image of the space. For reference, the terminal 101 may determine the position thereof using a space positioning technique, for example, a beacon, an Ultra Wide Band (UWB), and Wi-Fi footprinting, or a complex space positioning method, or may recognize the position thereof at the time when an image is captured by receiving the location information on the terminal from a server 103 while obtaining the image of the space in operation 111. For example, when the terminal 101 determines the position thereof in the aforementioned manner and analyzes the image of the space captured as a video, the terminal 101 can recognize the structure of the space (the structure of a building+the position and the shape of an object) and thus can generate a constituent image of the space. That is, the terminal 101 can analyze the structure of the space using the position of the terminal that photographs the space and a space image from the position through 3D modeling.

Figure 2A:
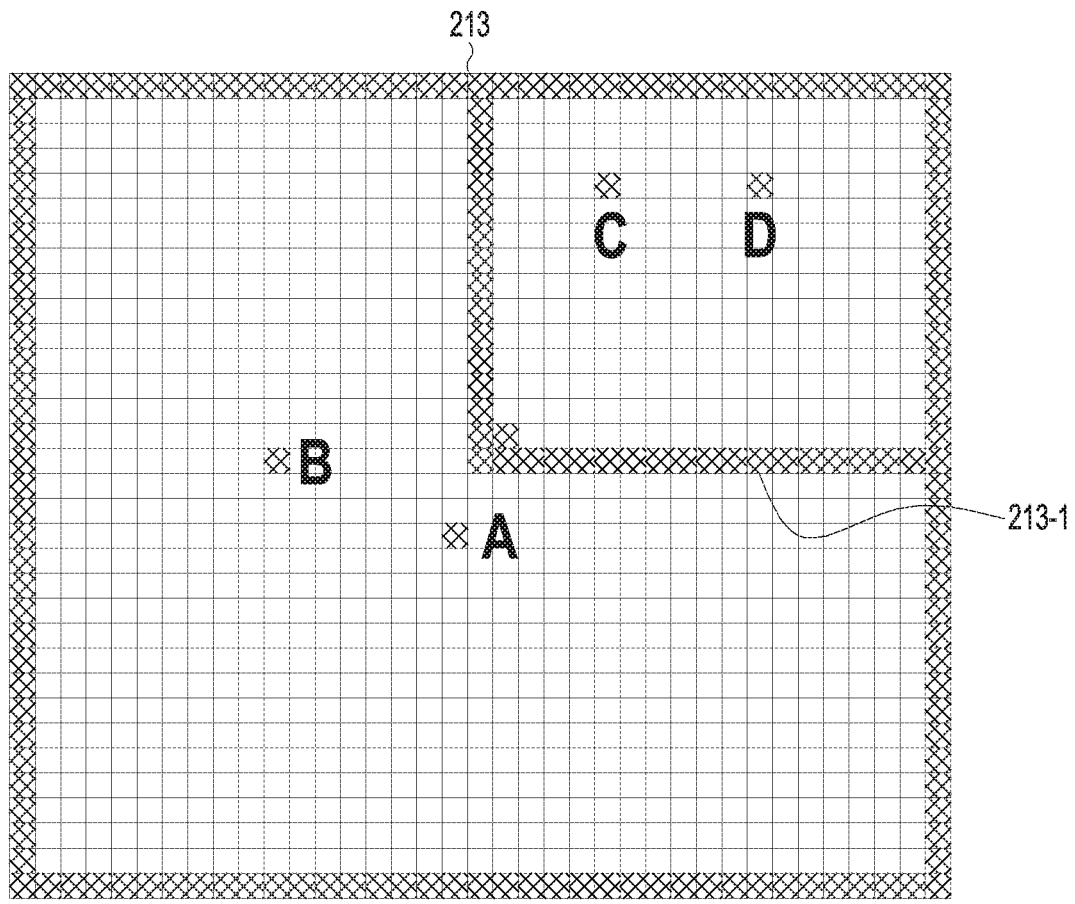
FIGS. 2A to 2G are diagrams illustrating an example of an operation for displaying a sensor detection area according to an embodiment of the present disclosure.
Figure 2B:
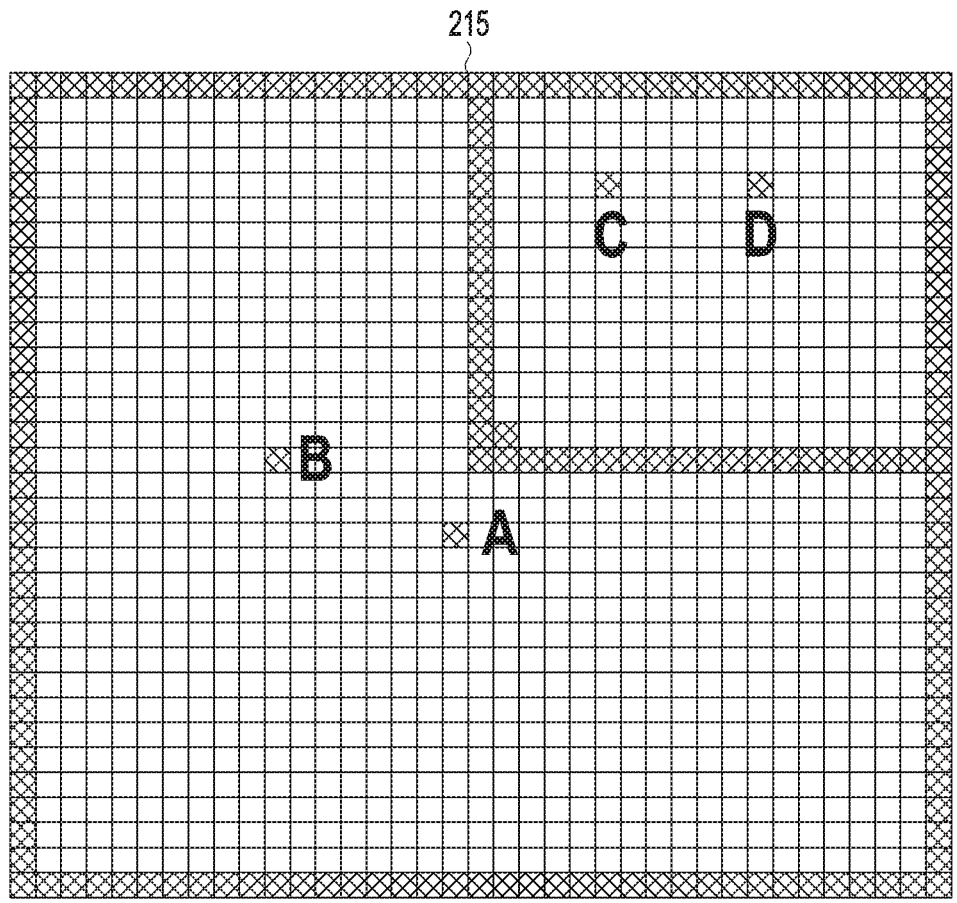
Figure 2C:
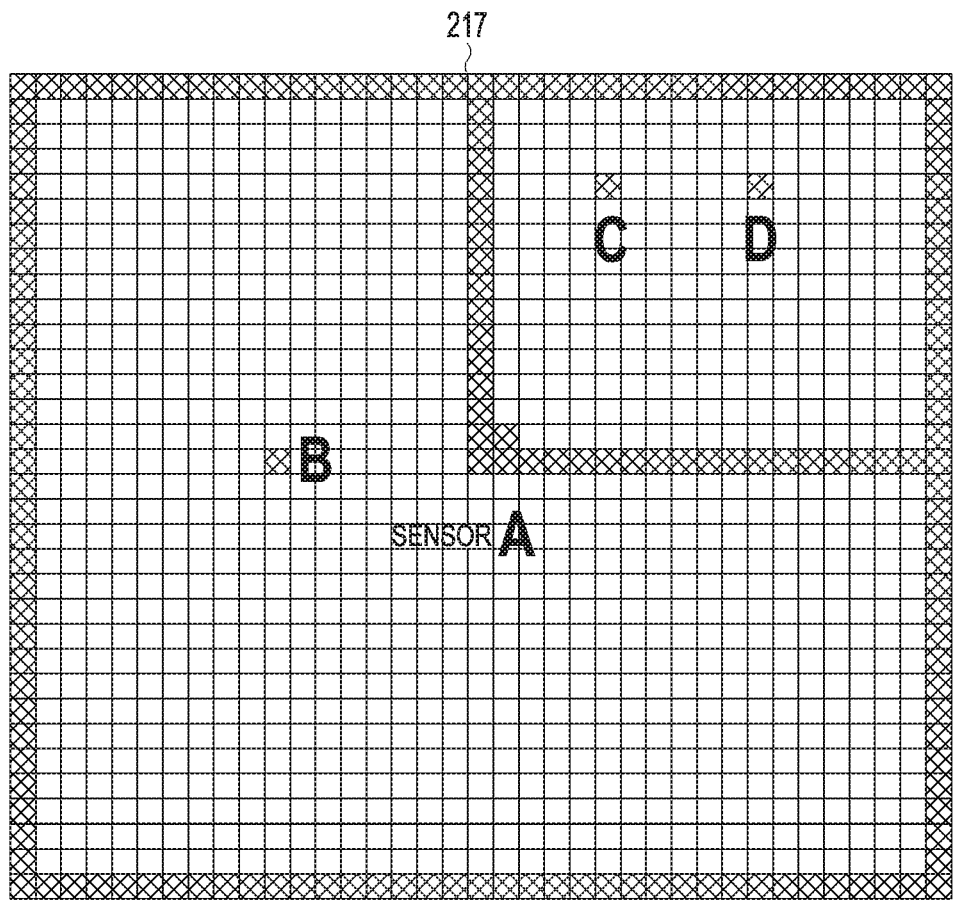

In another embodiment, the constituent image of the space may be obtained by analyzing the image of the space and obtaining objects installed in the space, for example, from the server 103, or by a method of displaying a two-dimensional or three-dimensional drawing illustrating the structure of a building, such as CAD, stored in advance in the terminal 101. An example of the constituent image of the space is shown in operation 213 of FIG. 2A. The constituent image shown in FIG. 2A is a plan view of a two-dimensional image and shows an inner wall 213-1 of the space and objects. A, B, C, and D in the space. However, the constituent image of the space may be displayed three-dimensionally. When the terminal 101 captures the image of the space three-dimensionally, the three-dimensional image of the space captured by the terminal 101 may be used as the constituent image of the space.

In operation 115, the constituent image of the space is formed into a grid. In operation 215 of FIG. 2B, an example of forming the constituent image of the space into a grid is shown. However, operation 115 is not an essential process but an optional process.

In operation 117, the terminal 101 may obtain the sensor IDs of sensors installed in the space from the image of the space and a mapping table per sensor stored in the terminal 101. The mapping table per sensor includes information on a relationship between a sensor image, such as an overall image of a sensor or a feature image of the sensor, and the ID of the sensor. The terminal 101 may detect, from the image of the space, a sensor image that is the same as or similar to sensor images included in the mapping table per sensor, may identify the sensors installed in the space, and may obtain the sensor ID of an identified sensor. A specific example in which the terminal 101 obtains a sensor ID will be described with reference to FIG. 3.

FIG. 3 is a diagram illustrating an example of a mapping table per sensor.

Referring to FIG. 3, the terminal 101 scans a space image and checks whether a sensor corresponding to images of sensors 301 and 303 included in the table of FIG. 3 is included in the space image. When at least one of the sensors 301 and 303 stored in the table of FIG. 3 is included in the space image, the terminal 101 can know the sensor ID of the sensor from the table of FIG. 3. In operation 217 of FIG. 2C, an example is illustrated in which the terminal 101 displays sensor A in a constituent image of a space after obtaining a sensor ID from a sensor image.

In operation 119, the terminal 101 transmits an obtained sensor ID to the server 103. The server 103 may be a building management server that manages a building. This operation is for requesting sensor information on a corresponding sensor. In operation 121, the server 103 transmits "sensor information" of a sensor corresponding to the sensor ID to the terminal 101.

In another embodiment, the server 103 may also transmit, to the terminal 101, "sensor impact object information" which is information on objects that affect the detection area of the sensor, that is, sensor influencers. For reference, an object that affects the sensor refers to an object that affects the detection area of the sensor.

For example, when there is a heater around a temperature sensor, the detection area of the temperature sensor will be affected by the heater. Specifically, it is preferable that the temperature sensor measures the average temperature in the detection area of the temperature sensor. However, when there is the heater adjacent to the temperature sensor, the temperature sensor will measure the temperature of the heater and thus cannot indicate the average temperature in the detection area of the temperature sensor. Therefore, an area near the heater is excluded from the detection area of the temperature sensor because the temperature sensor cannot measure the average temperature that a user intends. In another example, in the case of an illumination sensor, when there is an object on a straight path between the illumination sensor and a position to be detected by the illumination sensor, the illumination sensor cannot measure the illuminance of the rear portion of the object, and thus the rear portion of the object is excluded from the detection area of the illumination sensor.

The "sensor influencer information" includes list information on sensor influencers, which are objects affecting a sensor. In addition, the sensor influencer information may also include influence degree information on a sensor influencer, which indicates the extent to which an object affects a sensor. For reference, the greater value the influence degree of a sensor influencer has, the greater influence a sensor receives from the sensor influencer.

FIG. 4 is a diagram illustrating an example of sensor information and sensor influencer information according to an embodiment of the present disclosure.

(a) shows an example of sensor information.

The table in (a) includes sensor information on sensors installed on the 18th floor in a building. For example, sensor 1 is positioned in zone A on the 18th floor of the building, the detectable distance range of sensor 1 is 12 m, the detection angle of sensor 1 is unlimited, sensor 1 is a temperature sensor, and the "influence function per distance (f(x))" of sensor 1 is "α/x", where α is an influence constant, for example, a value determined through simulation, and x means the distance from the sensor. The influence function per distance is a function indicating the influence degree of a sensor influencer according to the distance between the sensor influence and the sensor, in which as the distance of a sensor influencer from the sensor increases, the influence of the sensor influencer on the sensor decreases. Similarly to the example of sensor 1, detailed information on sensor 2 and sensor 3 are listed in the sensor information table.

(b) shows an example of sensor influencer information.

The table in (b) includes a list of sensor influencers existing on the 18th floor in the building and a detection influence coefficient (Y), which is influence degree information per sensor. Referring to the table in (b), the sensor influencers existing on the 18th floor are a fan heater, a TV, a fan, a gas stove, a refrigerator, and a computer. Further, the influence degree of the fan heater on a temperature sensor is 0.8, the influence degree on a humidity sensor is 0.9, the influence degree on an illumination sensor is 0, the influence degree on a carbon dioxide sensor is 0.7, and the influence degree on a gas/fire sensor is 0.8, and the influence degree on a human detection sensor that detects a human presence is 0. Also, information on the influence degree of the TV, the fan, the gas stove, the refrigerator, and the computer on the sensors may be known. The sensor influencer information may include images of the objects, and the terminal 101 may identify the objects from a space image captured by the terminal 101 using the images of the objects.

The influence function per distance (f(x)) included in the sensor information in (a) and the detection influence coefficient (Y) in (b) may be used when the terminal identifies a sensor influencer and then calibrates the initial detection area to determine the final detection area of a sensor or determines a position for installing an additional sensor. Specific methods for utilization will be described later.

Referring back to FIG. 1, in operation 123, the terminal 101 determines the initial detection area of the sensor. The initial detection area is determined in consideration of the constituent image of the space and the detection range and the detection angle of the sensor information, without identifying sensor influencers on the sensor. That is, the detection area is determined in view of the detection range and the detection angle of the sensor, without considering the influence function per distance (f(x)) described in (a) of FIG. 4 and the detection influence coefficient (Y) described in (b) of FIG. 4.

Figure 2D:
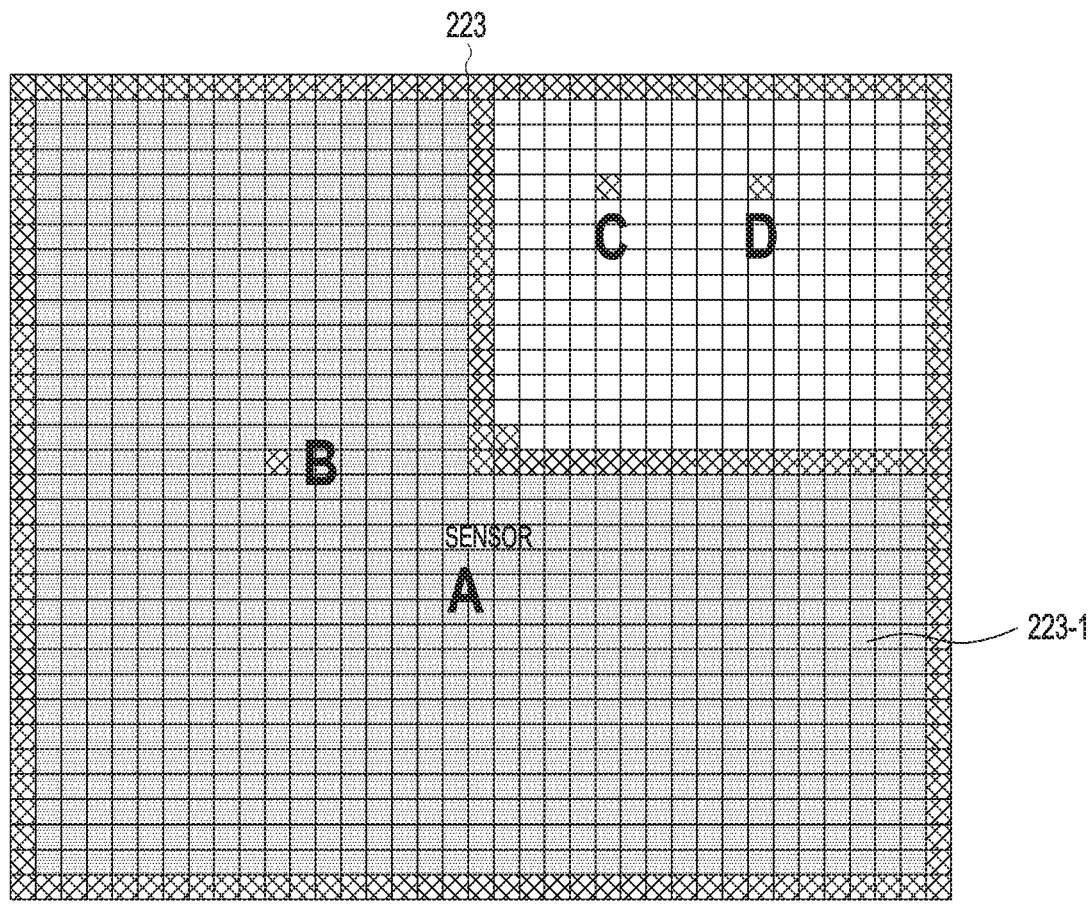
Figure 2E:
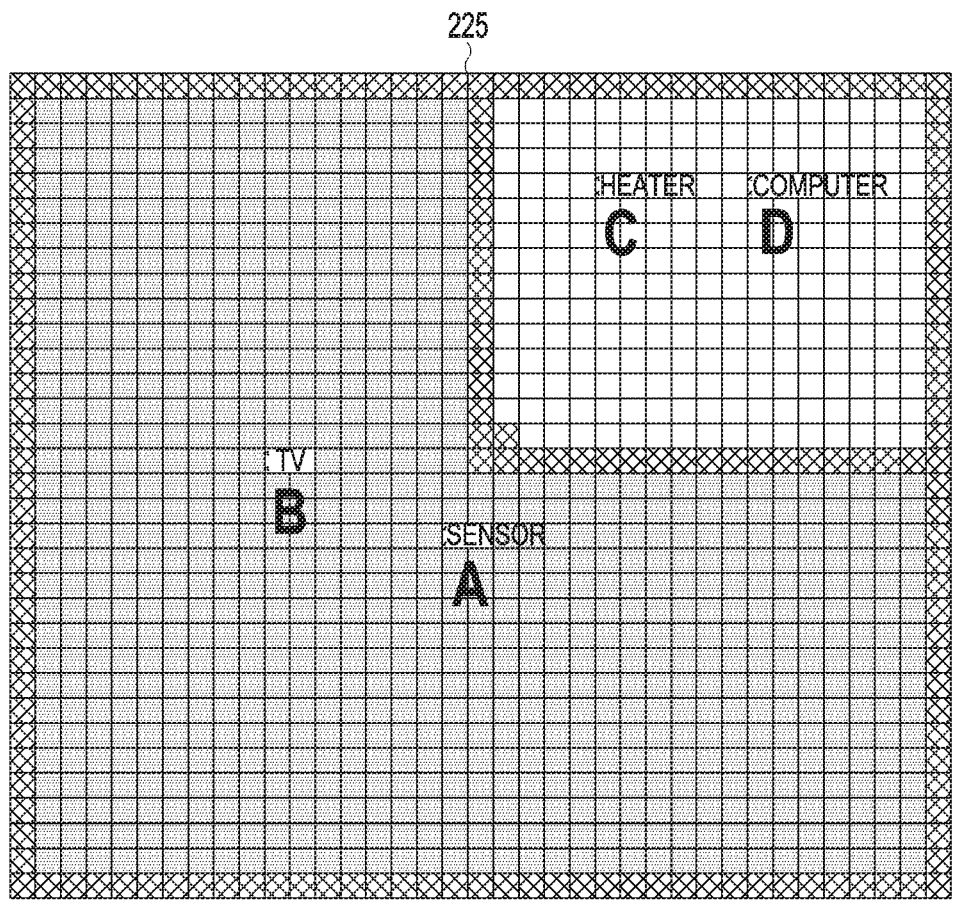

In operation 223 of FIG. 2D, an example of the initial detection area of sensor A is shown. That is, when sensor A is sensor 1 (=temperature sensor) in(a) of FIG. 4, the initial detection area of sensor A is determined on the basis of the detection range (12 m) and the detection angle (unlimited) of the sensor information in (a) of FIG. 4. Accordingly, although the presence of object B is recognized from a constituent image in an area 223-1 where the sensor is positioned, the detection area of sensor A is determined without identifying what object B is. In FIG. 2D, it is determined that the entire area 223-1 is within the detection range (12 m) of the temperature sensor, and thus the entire area 223-1 is determined as the initial detection area. For reference, since sensor A is a temperature sensor, the position where object B is located is also included in the initial detection area. For a temperature sensor, even in the presence of an object, the object is not large enough to obstruct measurement by the temperature sensor, and thus the detection area of the temperature sensor is not affected by the object as long as air can flow through the position where the object is located. Although the presence of object B is recognized from the constituent image in FIG. 2D, temperature sensor A can measure the temperature of an upper portion of object B, and object B does not affect the determination of the initial detection area of temperature sensor A. When sensor A is an illumination sensor, sensor A cannot detect the illuminance of a rear portion of object B, in which case the initial detection area may be different from the initial detection area of the temperature sensor.

Subsequent operation 125 is an optional operation and may be performed when sensor influencer information is received in operation 121. Therefore, operation 125 is shown in dotted lines. In operation 125, the terminal 101 identifies a sensor influencer that affects the sensor from the constituent image of the space using the sensor influencer information. In order to identify sensor influencers, using images of objects included in the sensor influencer information received in operation 121, the terminal 101 may identify what sensor influencers currently present in the space are from the image of the space, obtained in operation 111, and may utilize sensor influencer information corresponding to a corresponding influencer. In operation 225 of FIG. 2E, an example is shown in which the terminal 101 identifies sensor influencers. That is, a TV (B), a heater (C), and a computer (D) are illustrated as the sensor influencers.

In operation 127, the terminal 101 determines a final detection area. The final detection area may be determined for each sensor by a predetermined method on the basis of the determined initial detection area and the constituent image of the space.

Figure 2F:
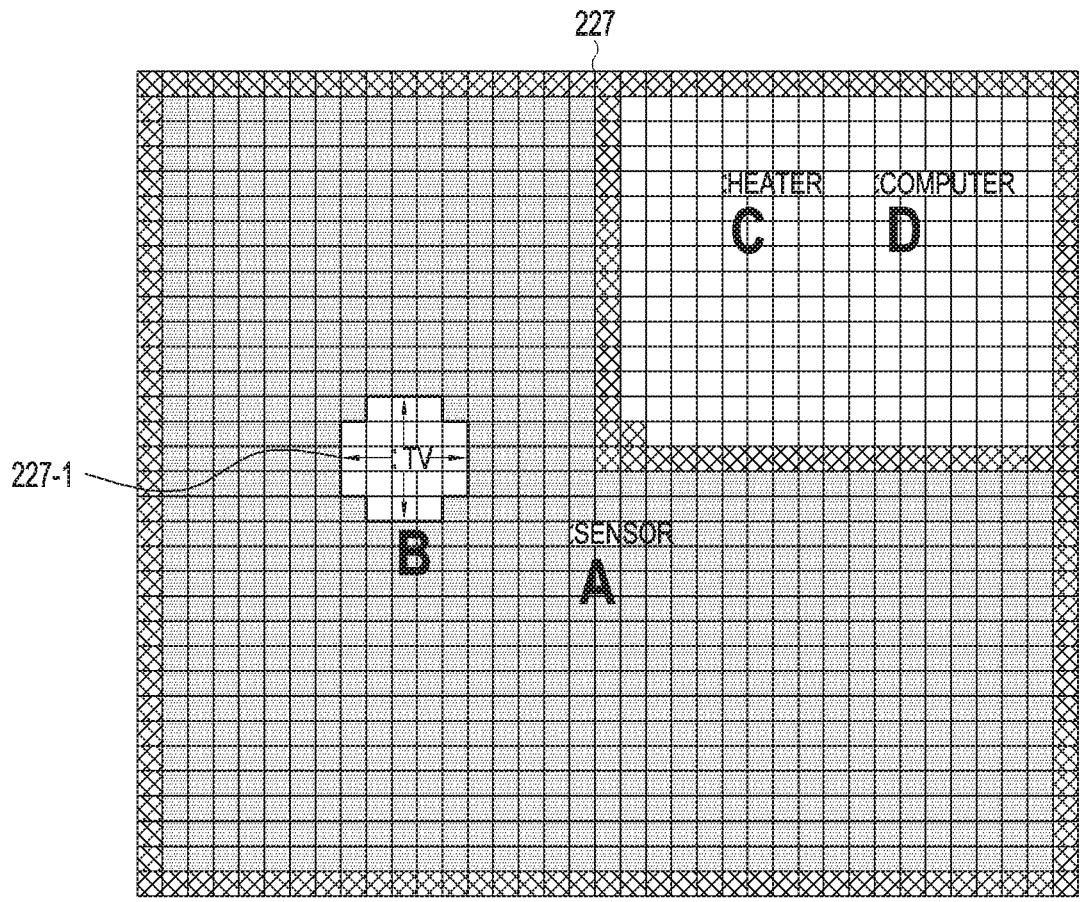

In another embodiment, when the terminal 101 receives the sensor influencer information in operation 121, the initial detection area may be calibrated in consideration of the influence degree of the sensor influencer in addition to the constituent image of the space, thereby determining a final detection area. In operation 227 of FIG. 2F, an example is shown in which a final detection area is determined by calibrating the initial detection area. Referring to FIG. 2F, sensor A identifies that object B is a TV, and the detection area of sensor A is calibrated in consideration of the influence function per distance (f(x)) described in (a) of FIG. 4 and the detection influence coefficient (Y) described in (b) of FIG. 4. That is, an area 227-1 is an area excluded from the initial detection area of sensor A in consideration of the influence function per distance (f(x)) of the temperature sensor and the detection influence coefficient (Y) of the TV on the temperature sensor. Specifically, the area 227-1 may be calculated to be a value obtained by multiplying the influence function per distance (f(x)) of the temperature sensor and the detection influence coefficient (Y). However, when the value obtained by multiplying the influence function per distance (f(x)) of the temperature sensor and the detection influence coefficient (Y) is a predetermined threshold value or less, in the area 227-1, the influence of object B on sensor A is determined to be very small and thus the area 227-1 may not be excluded from the initial detection area.

For reference, a calibration value for the detection area may be determined according to the calibration value represented by Equation 1 below. However, Equation 1 is merely an example for determining the calibration value, and the calibration value may be determined by various methods considering the influence degree of an object.

Calibration value=Detection influence coefficient ($Y$) of object on sensor $X$ Influence function per distance ($f(x)$) for each sensor  [Equation 1]

It may be construed that the periphery of an object affects the detection area of a sensor by the result of a calibration value according to Equation 1, and the peripheral area of the object, which affects the detection area of the sensor, may be excluded from the initial detection area, thereby determining the final detection area. However, when the calibration value is a predetermined threshold value or less, the initial detection area of the sensor may not be calibrated considering that the corresponding sensor influencer does not affect the sensor.

Figure 2G:
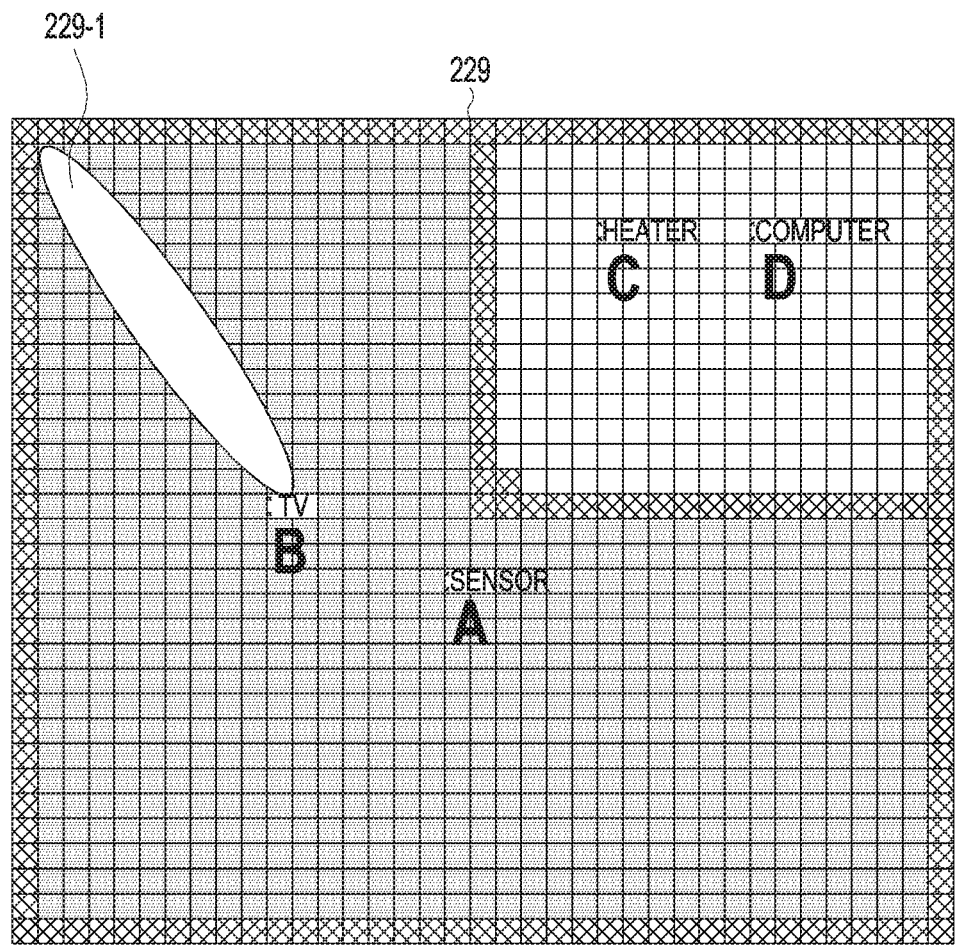

Different methods for determining a final detection area may be used for each sensor. FIG. 2F illustrates an example for a temperature sensor, while operation 229 of FIG. 2G illustrates another example of determining the final detection area of an illumination sensor. Specifically, the final detection area of the illumination sensor may be determined on the basis of whether an item, that is, an object, exists at a particular position within the initial detection area.

In operation 229 of FIG. 2G, sensor A, which is an illumination sensor, will not detect illuminance behind the TV (B) relative to sensor A. Therefore, an area 229-1 behind the TV (B) in FIG. 2G is indicated as an area that sensor A cannot detect (that is, a blind spot). However, it should be noted that the constituent image of the space in FIG. 2G is a two-dimensional image, and thus it is necessary to consider the height of the TV in determining the blind spot. For example, as the height of the TV (B) increases, the range of the blind spot of areas behind the TV increases. It is assumed that the TV (B) including a stand is positioned at a height of 1.2 m, and thus no illuminance is detected from the bottom to a height of 1 m and illuminance can be detected from 1 m to 2 m in height. In this case, it may be determined whether the area 229-1 behind the TV is the blind spot on the basis a predetermined threshold value. For example, when a threshold height for determining the blind spot is set to 1.5 m, in which case illuminance is not detected to a height of 1.5 m, the entire area 229-1 is determined as the blind spot. However, when the constituent image of the space is a three-dimensional image, the blind spot can be displayed three-dimensionally, and thus the same problem as in the case of the two-dimensional constituent image of the space will not occur. Methods for determining a final detection area per sensor with respect to other sensors will be described later.

Referring back to FIG. 1, in operation 129, it is determined whether an additional sensor is necessary for the space on the basis of the final detection area of the sensor. This operation is not an essential operation but may be performed as needed. In operation 129, it may be determined according to the user's decision whether a sensor is added by displaying an image of the final detection area determined in operation 127 to the user and by inquiring of the user whether to additionally install a sensor using a message on a popup window. When the image of the final detection area is displayed to the user, the detection area of the currently installed sensor and/or the blind spot of the sensor may be displayed to a building manager on a display of the terminal 101 using, for example, Augmented Reality (AR) technology. Here, the detection area of the sensor may be realized in various ways. For example, when the position of the currently installed sensor is displayed and a particular sensor among different types of sensors is selected, only the sensor of the selected type may be displayed to the user. Specifically, when a menu for selecting a sensor is displayed on the display of the terminal 101 and the user selects a smoke sensor, smoke sensor may be displayed to blink or may be displayed in a color different from that of other sensors. In addition, a method that highlights not only the position of the sensor but also the detection area of a sensor of a particular type may be used, thereby displaying a blind spot of the particular sensor in a reversed manner. In 615 of FIG. 6 to be described later, an example is shown in which a currently installed sensor and/or the detection area of the sensor are displayed. In 615 of FIG. 6, the detection areas of sensor A and sensor B currently installed and the detection area of a virtual sensor to be additionally installed are displayed according to a virtual sensor installation mode, which will be described below in operation 131. However, since operation 129 is an operation of displaying information on currently installed sensors to the user, only the currently installed sensor A and sensor B are displayed to the user except for the virtual sensor illustrated in 615 of FIG. 6.

The building manager can intuitively determine the displayed detection area and/or blind spot using the AR technique or the like and can easily determine whether an additional sensor is needed for the space.

In another example, the addition of a sensor may be determined according to a predetermined criterion, for example, whether the blind spot is a certain proportion of the entire area or greater or whether the blind spot includes a particular point in the space, without the user's decision.

When the addition of a sensor is determined in operation 129, an operation according to the virtual sensor installation mode is performed in operation 131. The detailed operation of the virtual sensor installation mode in operation 131 will be described with reference to FIGS. 5 and 6. When it is determined that a sensor is not added, the final detection area is displayed on the constituent image of the space in operation 133. Here, when the final detection area is displayed, as described above in operation 129, the detection areas and/or the blind spots of currently installed sensors may be displayed to the building manager on the display of the terminal 101 using, for example, the AR technology.

Hereinafter, the operation of the virtual sensor installation mode in operation 131 is described with reference to FIGS. 5 and 6.

Figure 5:
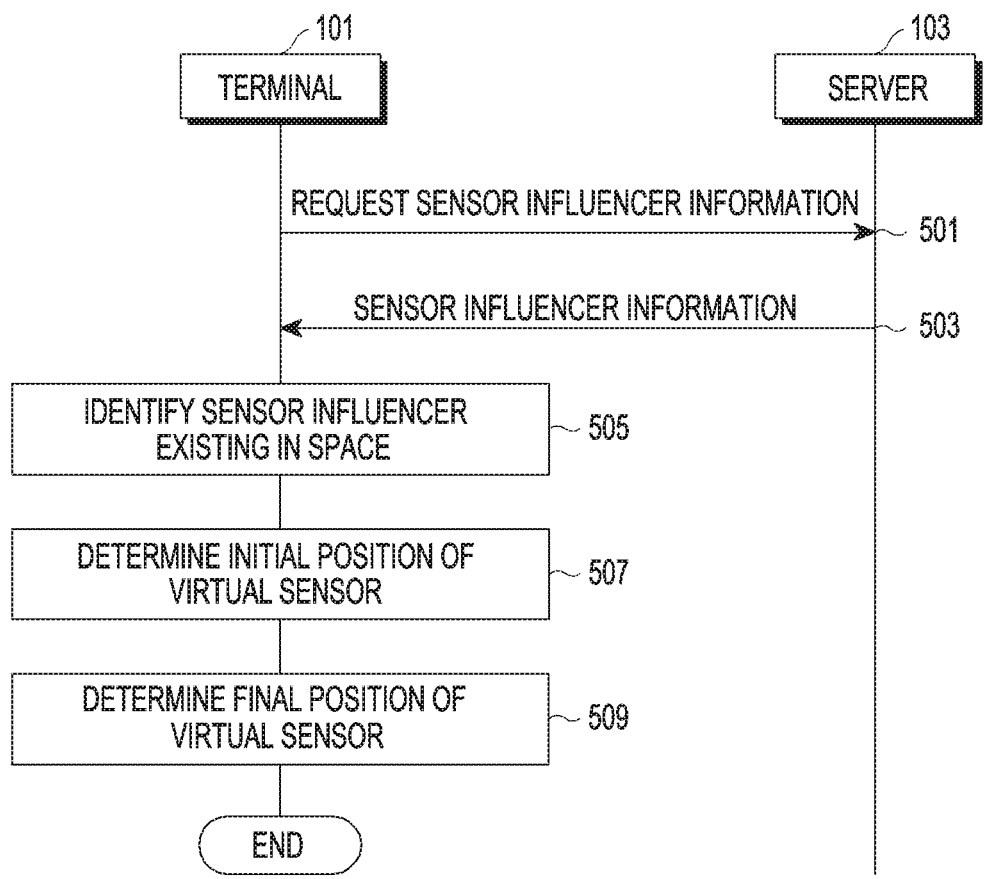
FIG. 5 is a diagram illustrating an operation of a virtual sensor installation mode according to an embodiment of the present disclosure.
Figure 6:
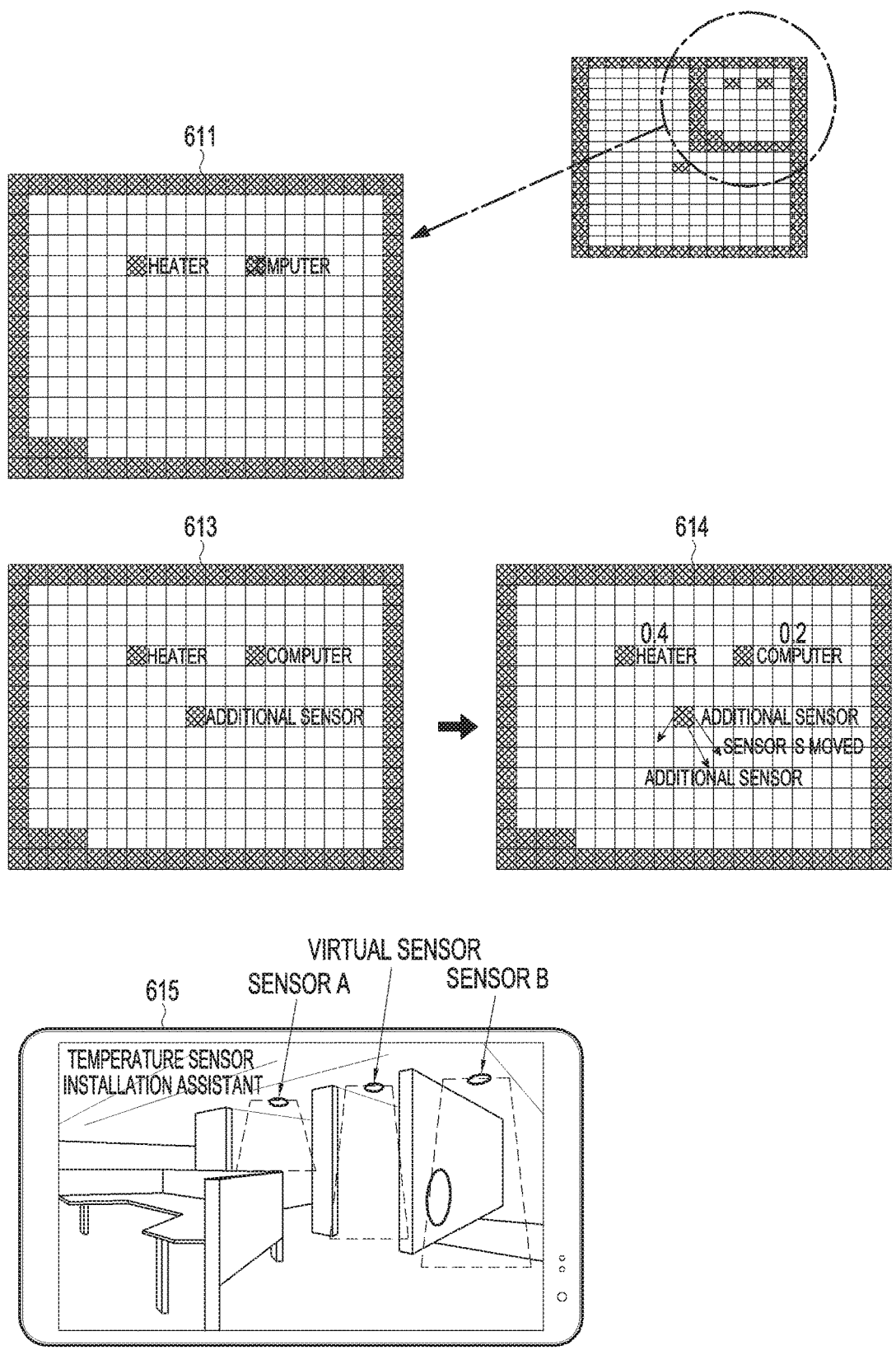
FIG. 6 is a diagram illustrating an example of determining a position for a virtual sensor to be installed in accordance with an operation of a virtual sensor installation mode according to an embodiment of the present disclosure.

FIG. 5 is a diagram illustrating an operation of a virtual sensor installation mode according to an embodiment of the present disclosure, and FIG. 6 is a diagram illustrating an example of determining a position for a virtual sensor to be installed in accordance with an operation of a virtual sensor installation mode according to an embodiment of the present disclosure.

The terminal 101 requests sensor influencer information from the server 103 in operation 501, and receives the sensor influencer information in operation 503. Here, when the terminal 101 receives the sensor influencer information in operation 121 of FIG. 1, operations 501 and 503 are not necessary.

In operation 505, the terminal 101 identifies a sensor influencer existing in the space on the basis of the sensor influencer information. Specifically, the terminal 101 may identify sensor influencers from the image of the space captured by the terminal 101 using images of sensor influencers included in the sensor influencer information. A drawing of operation 611 in FIG. 6 shows an example where the terminal 101 identifies sensor influencers, in which a heater and a computer are identified as objects.

In operation 507, the terminal 101 determines the initial position of a virtual sensor. The initial position of the virtual sensor may be determined by various methods on the basis of the detection areas of currently installed sensors and a constituent image of the space. In a representative example, a nesting algorithm for efficiently disposing irregular forms of items in a certain area or a genetic algorithm for obtaining the maximum coverage of sensors may be used. A drawing of operation 613 in FIG. 6 shows the determination of the initial position of the virtual sensor.

In operation 509, the terminal 101 determines a calibration value for calibrating the initial position of the virtual sensor in consideration of the sensor influencer existing in the space, and determines the final position of the virtual sensor according to the determined calibration value.

The calibration value may be determined on the basis of the influence function per distance (f(x)) of the sensor information described in (a) of FIG. 4 and the detection influence coefficient (Y) of the sensor influencer information described in (b) of FIG. 4. Specifically, the calibration value may be determined according to a calibration value represented by Equation 1. That is, the calibration value represented by Equation 1 may be used to determine the final detection area of the sensor or to determine a position for an additional sensor.

An example of determining a position for an additional sensor according to Equation 1 is as follows.

It is assumed in (a) of FIG. 4 that sensor 1, which is a temperature sensor, is additionally installed as a virtual sensor, there is a fan heater 1 m away from the initial position of the virtual sensor, and the influence constant value ($\alpha$) of sensor 1 is 0.2. Therefore, the influence function per distance (f(x))=0.2/10. In (b) of FIG. 4, the detection influence coefficient of the fan heater on the temperature of the fan heater is 0.8. Therefore, the calibration value is 0.2/1×0.8=0.16. According to the resulting calibration value, the final position of sensor 1 is a position 0.16 m moved from the initial position of sensor 1 relative to the fan heater. Therefore, although the initial position of sensor 1 is 10 m away from the fan heater, the final position of sensor 1 is 10+0.16 m away from the fan heater as a result of calibration in view of the distance between the sensor influencer and sensor 1 and the degree to which the sensor influencer affects the detection area of sensor 1.

A drawing of operation 614 in FIG. 6 shows that the final position of the virtual sensor is changed by calibrating the initial position of the virtual sensor. Referring to operation 614, a calibration value for the heater calculated by Equation 1 is 0.4 and a calibration value for the computer is 0.2. Therefore, the final position of the virtual sensor may be considered to be a point corresponding to the vector sum of a further movement of 0.4 m from the initial position relative to the heater and a further movement of 0.2 m from the initial position relative to the computer. That is, the final position of the virtual sensor is a value corresponding to a movement from the initial position of the virtual sensor by the vector sum of calibration values for sensor influencers with respect to the virtual sensor. In this sense, the vector sum of the calibration values with respect to the virtual sensor may be referred to as a "repulsive force vector".

When the final position of the virtual sensor is determined, the terminal 101 may display and output the virtual sensor in the constituent image of the space to the user according to the determined position of the virtual sensor. A drawing of operation 615 in FIG. 6 shows an example in which the final position of the virtual sensor is displayed in the constituent image of the space. This drawing shows that the position and the detection area of the virtual sensor to be additionally installed and the positions and the detection areas of sensor A and sensor B, which are previously installed, are displayed.

Hereinafter, a method of determining a final detection area described above in operation 127 of FIG. 1 is described for each sensor.

<Illumination Sensor/Human Detection Sensor>

An illumination sensor and a human detection sensor have the same methods for determining a final detection area.

A first method is a method of determining a final detection area on the basis of whether there is an object on a straight path between a particular point within the range of an initial detection area determined on sensor information and a sensor. That is, when there is an object on the path, it is difficult for the sensor to detect a person or light behind the object. Accordingly, an area behind the object may be determined as a blind spot that cannot be detected. This method is the same as that described above in operation 227 of FIG. 2.

In a second method, a calibration value is determined considering a sensor influencer according to the first method, and an initial detection area is calibrated according to the determined calibration value, thereby determining a final detection area. The second method may be applied when the terminal receives the sensor influencer information in operation 121 of FIG. 1, in which case the calibration value defined by Equation 1 may be used in determining the final detection area. The second method is the same as that described above in operation 127.

<Temperature Sensor>

In a first method, an air current is simulated at a particular position in a space, and when the simulation proves that an air current can flow at the particular position, the particular position is determined as a final detection area.

The simulation method may be performed as follows. First, numerical analysis is performed to analyze air current and temperature distribution in a space before the increase of the volume of air flowing into the particular position. The numerical analysis may be performed, for example, by a finite volume method. Then, an unsteady numerical analysis is performed to analyze the distribution of an air current and temperature distribution over time after the increase of the volume of flowing air using the result of the numerical analysis as an initial condition.

In a Second method, when an air current can flow at the particular position as a result of the simulation by the first method and temperature responsiveness at the position is less than a predetermined value, the particular position is determined as a final detection area. For reference, the temperature responsiveness is a capability of quickly detecting ambient temperature. A lower temperature responsiveness value indicates higher temperature responsiveness, in which ambient temperature can be quickly detected.

In a third method, a calibration value is determined considering sensor influencer information according to the first method or the second method, and an initial detection area is calibrated according to the determined calibration value, thereby determining a final detection area. The third method may be applied when the terminal receives the sensor influencer information in operation 121 of FIG. 1, in which case the calibration value defined by Equation 1 may be used in determining the final detection area. The third method is the same as that described above in operation 127.

<Smoke Detection Sensor>

In a first method, similar to the first method for the temperature sensor, an air current is simulated at a particular position in a space, and when the simulation proves that an air current can flow at the particular position, the particular position is determined as a final detection area.

A second method is the same as the first method for the illumination sensor. That is, when there is no object on a straight path within the detection distance of a sensor on the basis of sensor information, a corresponding area is determined as a detection area. That is, a final detection area is determined on the basis of whether there is an object on a straight path between a particular point within the range of an initial detection area determined on sensor information and a sensor.

In a third method, a calibration value is determined considering sensor influencer information according to the first method or the second method, and an initial detection area is calibrated according to the determined calibration value, thereby determining a final detection area. The third method may be applied when the terminal receives the sensor influencer information in operation 121 of FIG. 1, in which case the calibration value defined by Equation 1 may be used in determining the final detection area. The third method is the same as that described above in operation 127.

Hereinafter, a method of determining a position for a virtual sensor to be installed in the operation of the virtual sensor installation mode described above in operation 131 of FIG. 1 is described for each sensor.

<Illumination Sensor/Human Detection Sensor>

An illumination sensor and a human detection sensor may be applied in the same manner as described above in FIG. 5. That is, the initial position of a virtual sensor may be determined using a nesting algorithm or a genetic algorithm, and a calibration value may be calculated considering a sensor influencer at the determined initial position to calibrate the initial position, thereby determining a final position for the virtual sensor to be installed.

<Temperature Sensor>

As described above, in the second method for determining the final detection area of the temperature sensor, when an air current can flow as a result of simulating an air current at a particular position and temperature responsiveness is less than a predetermined value, the particular position is determined as a final detection area. When determining a position for a virtual sensor to be installed in the temperature sensor, the above simulation result and temperature responsiveness may also be considered.

That is, in a first method, a position where an air current can flow as a result of simulating an air current and temperature responsiveness is minimum is determined as a position for a virtual sensor to be installed. For reference, a position with minimum temperature responsiveness may be determined as follows. That is, a time constant is calculated at a plurality of candidate positions, and the time constants at the candidate positions are compared, thereby determining a position with the minimum time constant as a position with minimum temperature responsiveness, where a virtual sensor may be installed.

A second method is the same as that described above in FIG. 5. That is, the initial position of a virtual sensor may be determined using a predetermined space arrangement algorithm, and a calibration value may be calculated considering a sensor influencer at the determined initial position to calibrate the initial position, thereby determining a final position.

<Smoke Detection Sensor/Other Sensors>

In a first method, one type of a smoke detection sensor to be installed is selected from among a plurality of types, a model map equivalent or similar at a predetermined reference level or higher is found by comparing a space for currently installing a virtual sensor with spaces provided in model maps for the selected sensor, and a position provided in an installation guide provided by the model map is determined as an installation position. Table 1 below shows types of smoke detection sensors, and Table 2 below shows an example of a model map that provides a guide on a space for a sensor to be installed.

TABLE 1

| Detector type | Smoke detector Linear constant-temperature detection type Differential spot type Constant-temperature spot type Pneumatic tube type |
| --- | --- |

TABLE 1-continued

Thermal semiconductor differential distribution type
Thermocouple differential distribution type

TABLE 2

Figure 13A:
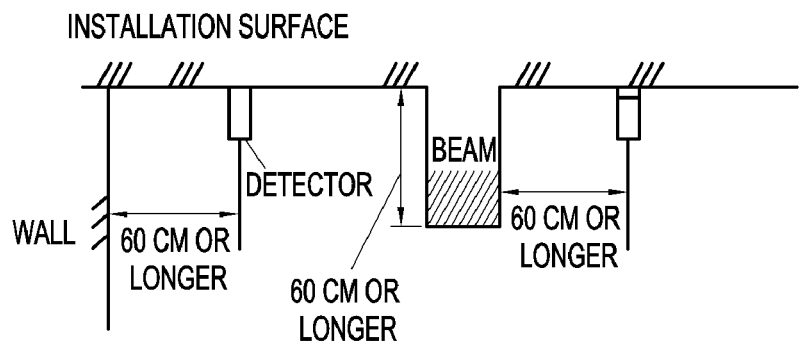
FIGS. 13A, 13B and 13C show model maps that provide a guide on a space for a sensor to be installed according to embodiments of the present disclosure.
Figure 13B:
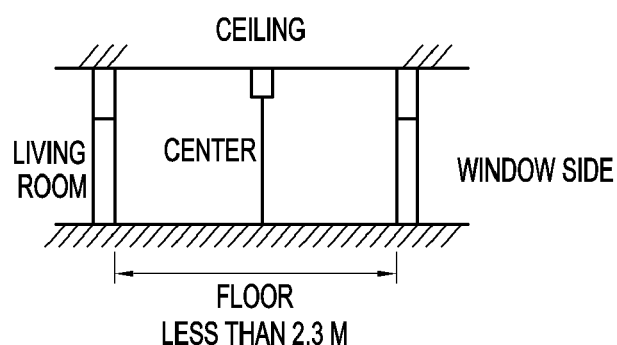
Figure 13C:
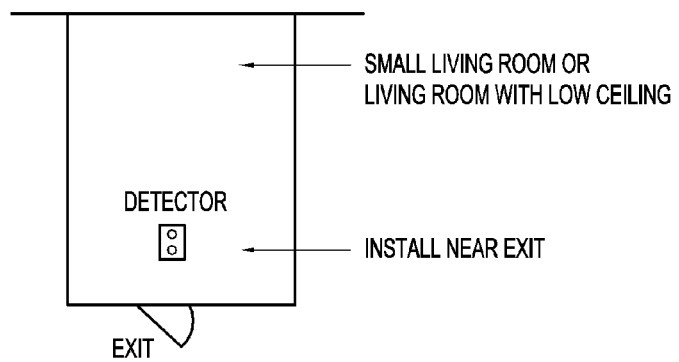

| Model map | Installation guide |
| --- | --- |
| Model map shown in FIG. 13A | Install at a position 60 cm or longer away from a wall or beam in a hallway |
| Model map shown in FIG. 13B | Install at the center in a passage less than 1.2 m wide |
| Module map shown in FIG. 13C | Install near the exit in a living room with a low ceiling or a small living room<br>A living room with a low ceiling refers to a living room less than 2.3 m from the floor to the ceiling<br>A small living room refers to a living room smaller than 40 m$^2$ |

A second method is the same as that described above in FIG. 5. That is, the initial position of a virtual sensor may be determined using a predetermined space arrangement algorithm, and a calibration value may be calculated considering a sensor influencer at the determined initial position to calibrate the initial position, thereby determining a final position for a virtual sensor to be installed.

A basic embodiment of the present disclosure focusing on FIG. 1 has been described with reference to FIGS. 1 to 6. Hereinafter, a modified embodiment of the present disclosure is described with reference to FIGS. 7 to 9. In each drawing, a description of details overlapping with those of FIG. 1 is omitted, and differences from FIG. 1 are described.

Figure 7:
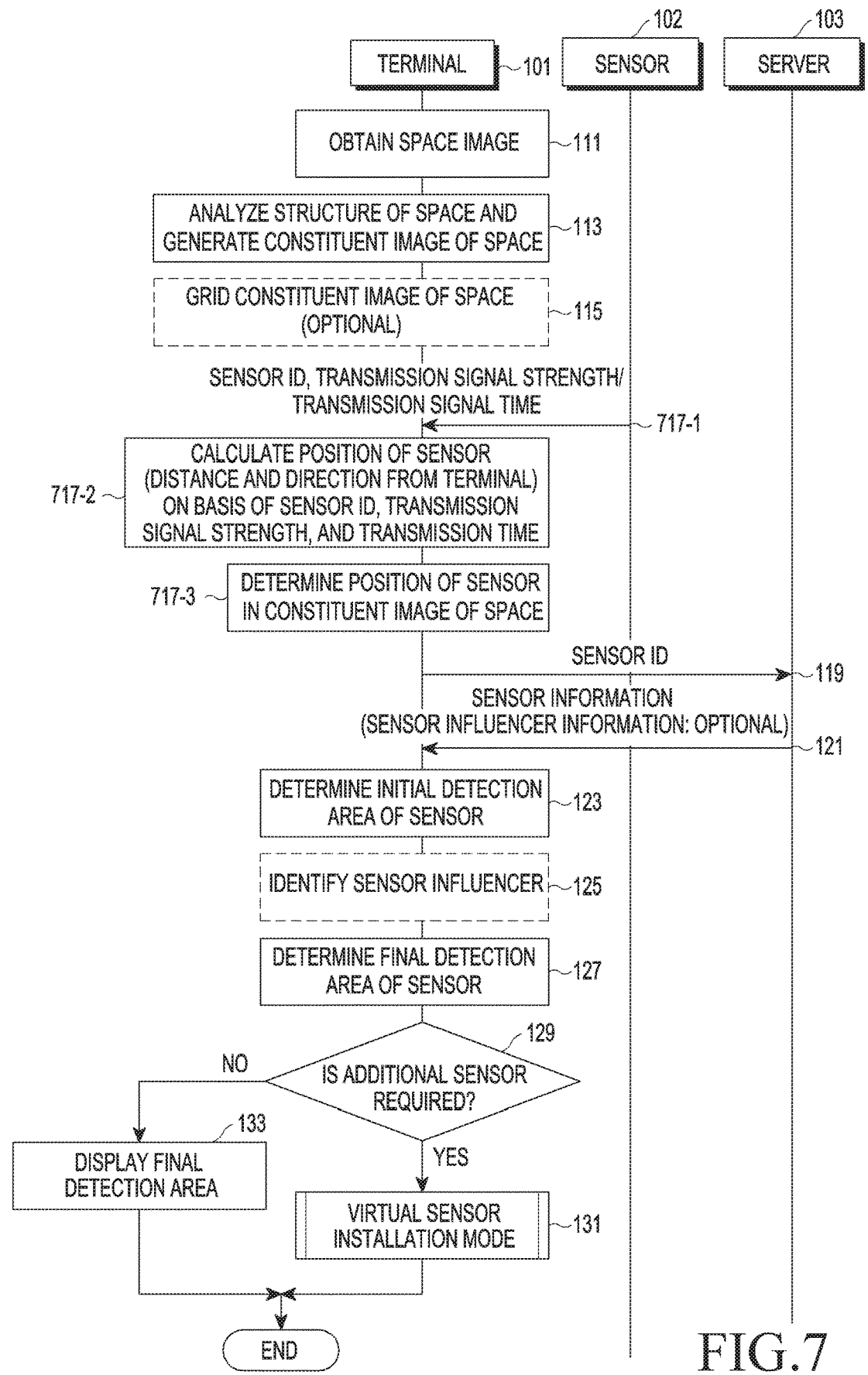
FIG. 7 is a diagram illustrating an example of receiving information related to a sensor from a server according to another embodiment of the present disclosure.
Figure 8:
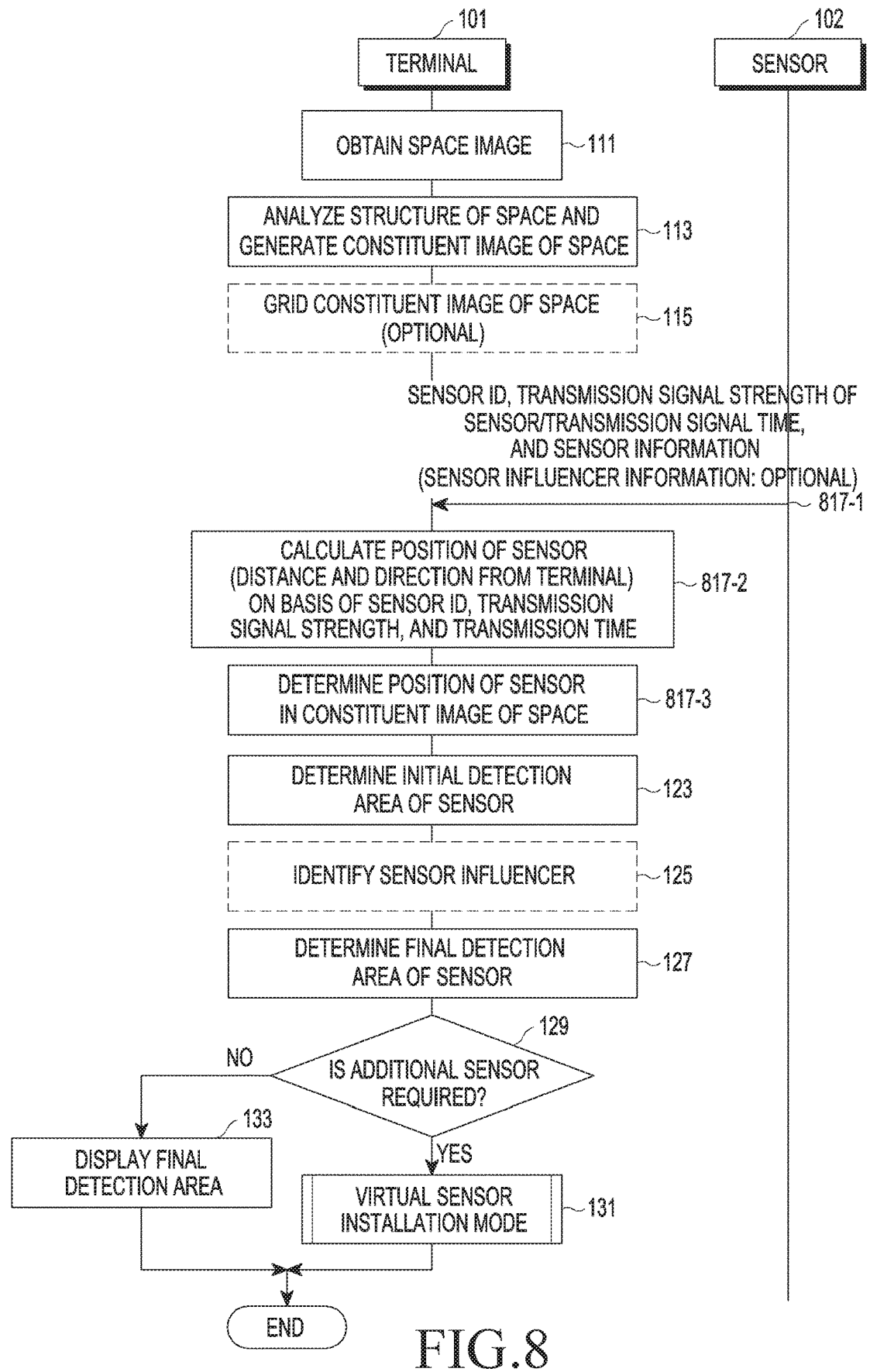
FIG. 8 is a diagram illustrating an example of receiving information related to a sensor from the sensor according to still another embodiment of the present disclosure.
Figure 9:
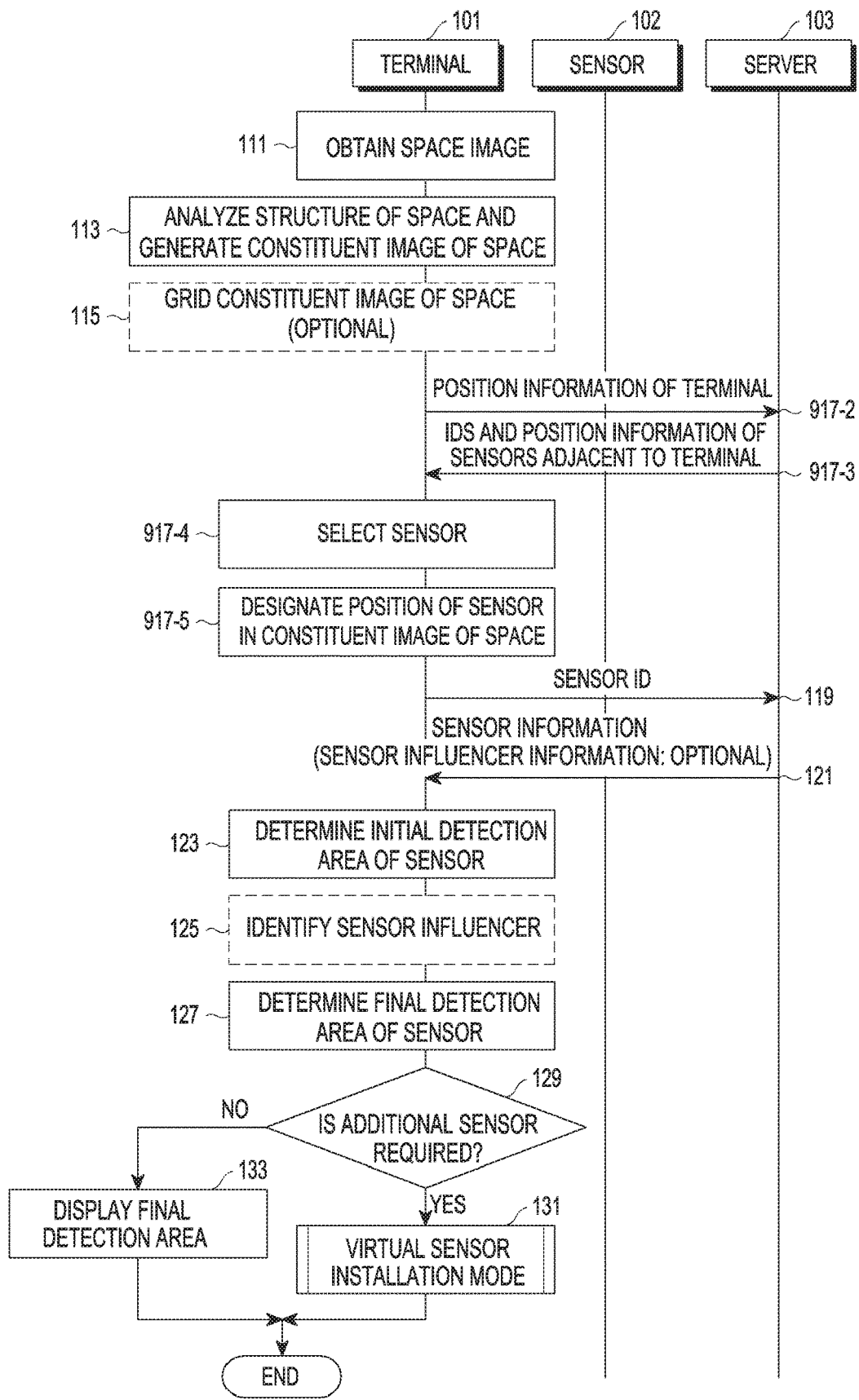
FIG. 9 is a diagram illustrating an example in which a terminal 101 transmits position information thereof to a server and receives information relating to a sensor from the server according to another embodiment of the present disclosure.

In FIG. 1, the terminal identifies a sensor from a captured two-dimensional or three-dimensional space image. However, since a sensor is generally small in size, it may be difficult to identify the sensor from a captured image. Therefore, a terminal may receive information, such as the position and the sensor ID of a sensor, from the sensor or a server. FIGS. 7 to 9 illustrate modified embodiments.

FIG. 7 is a diagram illustrating an example of receiving information related to a sensor from a server according to another embodiment of the present disclosure.

Explaining only differences from FIG. 1, the terminal 101 obtains a sensor ID from a space image and a mapping table per sensor stored in the terminal 101 in operation 117 of FIG. 1, whereas a terminal 101 receives, from a sensor 102, a sensor ID and the transmission signal strength and/or transmission signal time of a signal transmitted from the sensor 102 in operation 717-1 of FIG. 7. For reference, the sensor 102 may transmit such information to the terminal 101 through broadcast or a pairing operation with the terminal 101. In addition, the exchange of information between the sensor 102 and the terminal 101 may be performed by various communication methods, such as not only broadcast or pairing but also wireless communication methods including Bluetooth, BLE, Near-Field Communication (NFC), ZigBee, Z-Wave, RFID, Infrared Data Association (IrDA), or LTE D2D.

In operation 717-2, the terminal 101 calculates the position of the sensor, that is, the distance and the direction from the terminal 101, on the basis of the received sensor ID, transmission signal strength, and/or transmission signal time. When the sensor 102 transmits strength information on a signal transmitted by the sensor 102 to the terminal 101, the terminal 101 may compare the strength information on the transmitted signal with the received signal strength and may estimate the distance between the 101 and the sensor using the difference between the signal strengths. This is called a distance measurement method using a Received Signal Strength Indicator (RSSI). Also, the distance between the sensor and the terminal 101 may be calculated using the time difference between the transmission time the sensor 102 transmits a signal and the time the terminal 101 receives the signal. In operation 717-3, the terminal 101 determines the position of the sensor in a constituent image of a space on the basis of the calculation result. Subsequent operations are the same as those in FIG. 1, and thus are omitted.

FIG. 8 is a diagram illustrating an example of receiving information related to a sensor from the sensor according to still another embodiment of the present disclosure.

Explaining differences from FIG. 1, the terminal 101 obtains a sensor ID from a space image and a mapping table per sensor stored in the terminal 101 in operation 117 of FIG. 1, whereas a sensor 102 transmits, to a terminal 101, sensor information including a sensor ID, the transmission signal strength (or transmission signal time) of a signal transmitted from the sensor, and a detection distance in operation 817-1 of FIG. 8. In an additional example, the sensor 102 may transmit sensor influencer information to the terminal 101. The terminal 101 calculates the position of the sensor (the distance and direction from the terminal 101) using the received information in operation 817-2, and determines the position of the sensor in a constituent image of a space in operation 817-3.

In FIG. 8, the terminal 101 receives all of the sensor information and/or the sensor influencer information from the sensor 102 and thus does not further need to communicate with a server. Therefore, operations 119 and 121 of FIG. 1 are omitted in FIG. 8.

FIG. 9 is a diagram illustrating an example in which a terminal 101 transmits position information thereof to a server and receives information relating to a sensor from the server according to another embodiment of the present disclosure.

Differences from FIG. 1 are explained. In operation 117 of FIG. 1, the terminal 101 obtains a sensor ID from an image. In FIG. 9, a terminal 101 stores position information on the terminal at the time of capturing a space image used for generating a constituent image of the space in operation 113, and transmits the stored position information to a server 103. The terminal 101 may receive the IDs of sensors adjacent to the photographing position of the terminal 101 and position information on the sensors from the server 103 in operation 917-3, may select at least one sensor 102 among the sensors in operation 917-4, and may designate the position of the sensor in a constituent image of the space to identify the sensor in operation 917-5. Operation 119 and subsequent operations are the same as those in FIG. 1.

Hereinafter, a method and a device configuration for a terminal will be described on the basis of the foregoing embodiments of the present disclosure.

Figure 10:
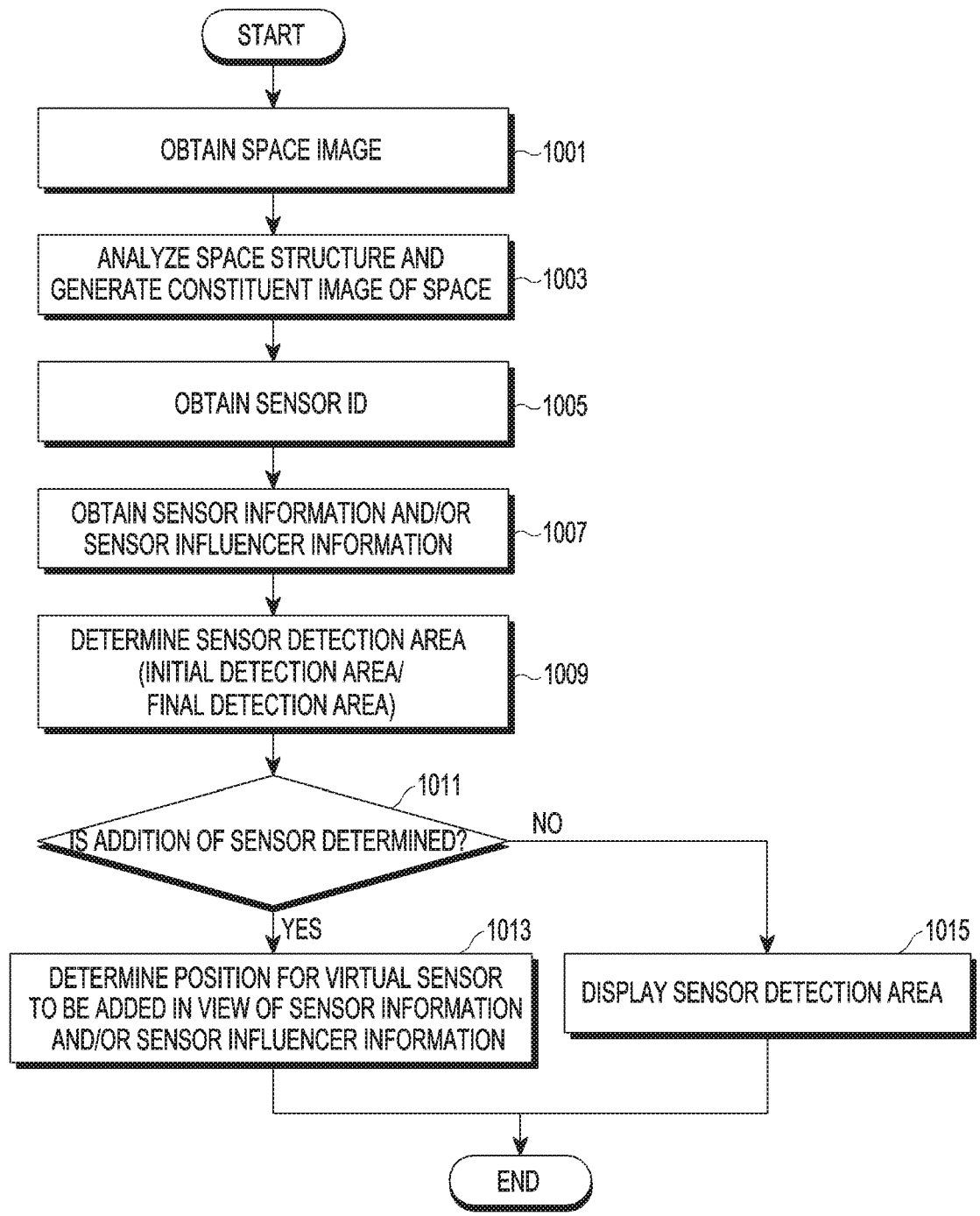
FIG. 10 is a diagram illustrating the operation of a terminal according to an embodiment of the present disclosure.

FIG. 10 is a diagram illustrating the operation of a terminal according to an embodiment of the present disclosure.

In operation 1001, the terminal obtains a space image captured using a camera or the like. In operation 1003, the terminal analyzes the structure of a space using the space image and generates a constituent image of the space. The constituent image of the space may be generated on the basis of at least one of position information on the terminal and the space image. In another embodiment, the constituent image of the space may be generated using the space image and a drawing showing a building structure, such as CAD. In operation 1005, the sensor ID of a sensor installed in the space is obtained. For the sensor ID, a sensor image may be identified from the space image, and a sensor ID corresponding to the sensor image may be obtained from previously stored mapping table information on each sensor. Alternatively, the sensor ID may be received directly from the sensor. In operation 1007, sensor information including information such as the detection range of the sensor ID and/or sensor influencer information are obtained. The sensor information and/or the sensor influencer information may be received directly from the sensor or may be received from a server. In operation 1009, the terminal determines a sensor detection area using the sensor information and/or sensor influencer information. That is, after an initial detection area is determined on the basis of the sensor information, a final detection area is determined. In operation 1011, the terminal determines whether to add a sensor on the basis of the final detection area. When it is determined that the sensor is added, the terminal determines a position for a virtual sensor to be added in view of the sensor information and/or the sensor influencer information in operation 1013. When it is determined that the sensor is not added, the terminal displays the determined final detection area in operation 1015.

Figure 11:
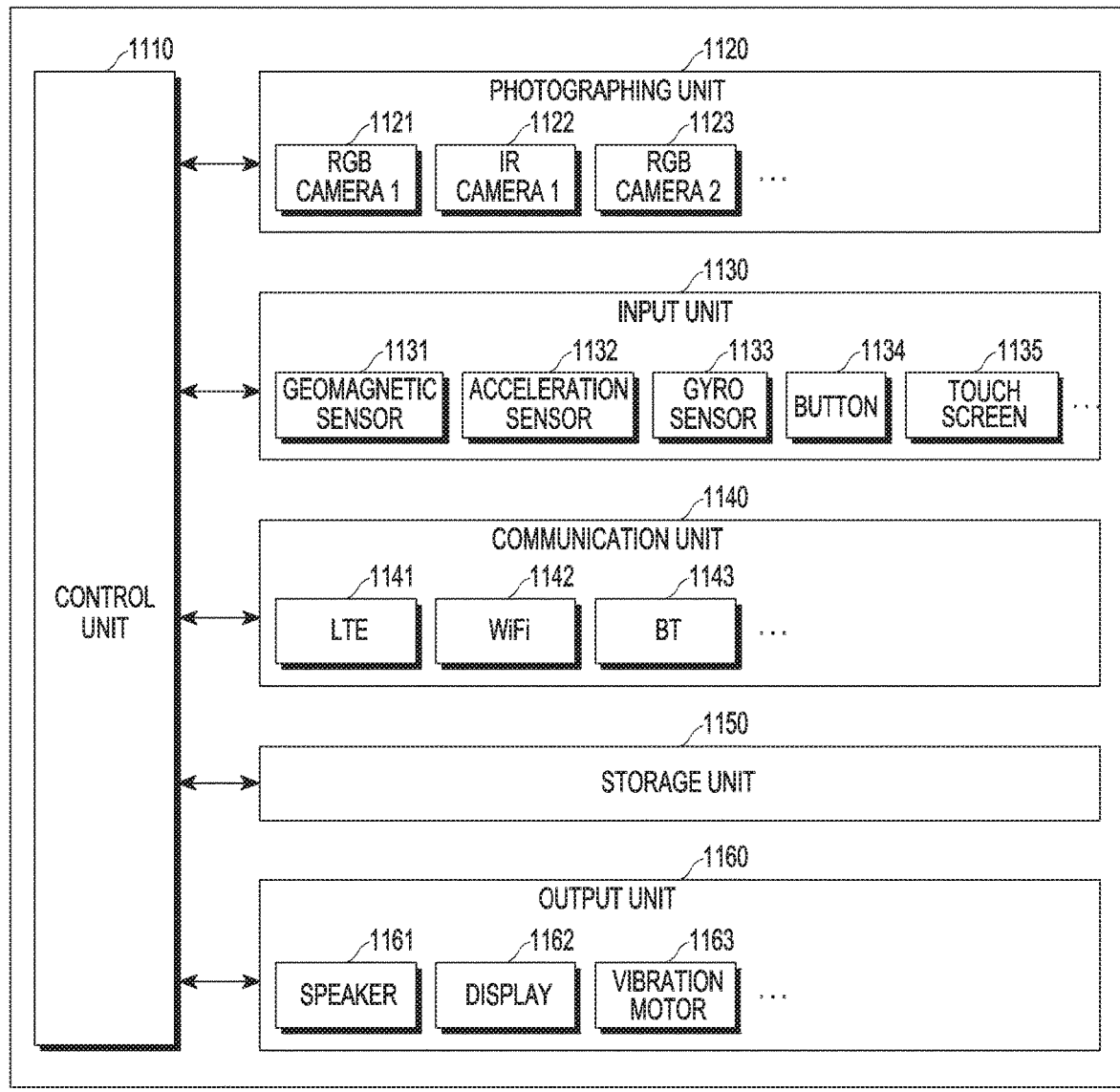
FIG. 11 is a diagram illustrating the configuration of a terminal device according to an embodiment of the present disclosure.

FIG. 11 is a diagram illustrating the configuration of a terminal device according to an embodiment of the present disclosure.

The terminal device includes a control unit 1110, a photographing unit 1120, an input unit 1130, a communication unit 1140, a storage unit 1150, and an output unit 1160.

The control unit 1110 performs the overall operations of the foregoing embodiments of the present disclosure and controls other components of the terminal device. For example, the control unit 110 may generate a constituent image of a space using a space image and position information on the terminal, and may determine the initial detection area and/or the final detection area of a sensor on the basis of sensor information and/or sensor influencer information. Further, the control unit 1110 may determine whether an additional sensor is needed, and performs an operation necessary for a virtual sensor installation mode if an additional sensor is needed. Since specific operation methods have been described in the above embodiments, a description thereof is omitted below.

The photographing unit 1120 includes various camera modules 1121, 1122, and 1123, and captures a two-dimensional or three-dimensional space image according to an embodiment of the present disclosure. The input unit 1130 includes user interface components 1134 and 1135 and various sensors 1131, 1132, and 1133. The communication unit 1140 includes communication modules 1141, 1142, and 1143 for the terminal device to perform communication and is used to perform communication with a server. The storage unit 115 stores various kinds of information for an embodiment of the present disclosure, for example, sensor image information, sensor information, and sensor influencer information. According to the various embodiments described above, the information may be received directly from the server or sensors or may be stored in advance in a terminal. The output unit 1160 includes various components 1161, 1162, and 1163 for outputting an item necessary for the user according to the foregoing embodiments.

Embodiments of determining the detection area of a sensor and determining a position for a sensor to be added when an additional sensor is needed have been described according to the present disclosure. The present disclosure may be extended to IoT devices. For example, the present disclosure may be applied to determine up to which position the light of a bulb, instead of a sensor, affects in a space. That is, according to the foregoing embodiments, when purchasing a bulb on the Internet, the user can determine up to which position the light of the bulb affects in a space when installing the bulb at a particular position in the space, without actually installing the bulb. Further, even without purchasing and installing a bulb in the user's home, the user can determine the actual color of the light of the bulb or whether the color of the light of the bulb to be purchased is similar to the color of the light of a bulb currently installed in the user's home. In the foregoing embodiments, the sensor may be replaced with a bulb, and sensor influencers may be replaced with objects that obstruct the emission of light from the bulb, such as a refrigerator, a TV, another bulb, a washing machine, a computer, an air conditioner, and a robotic vacuum cleaner.

Figure 12:
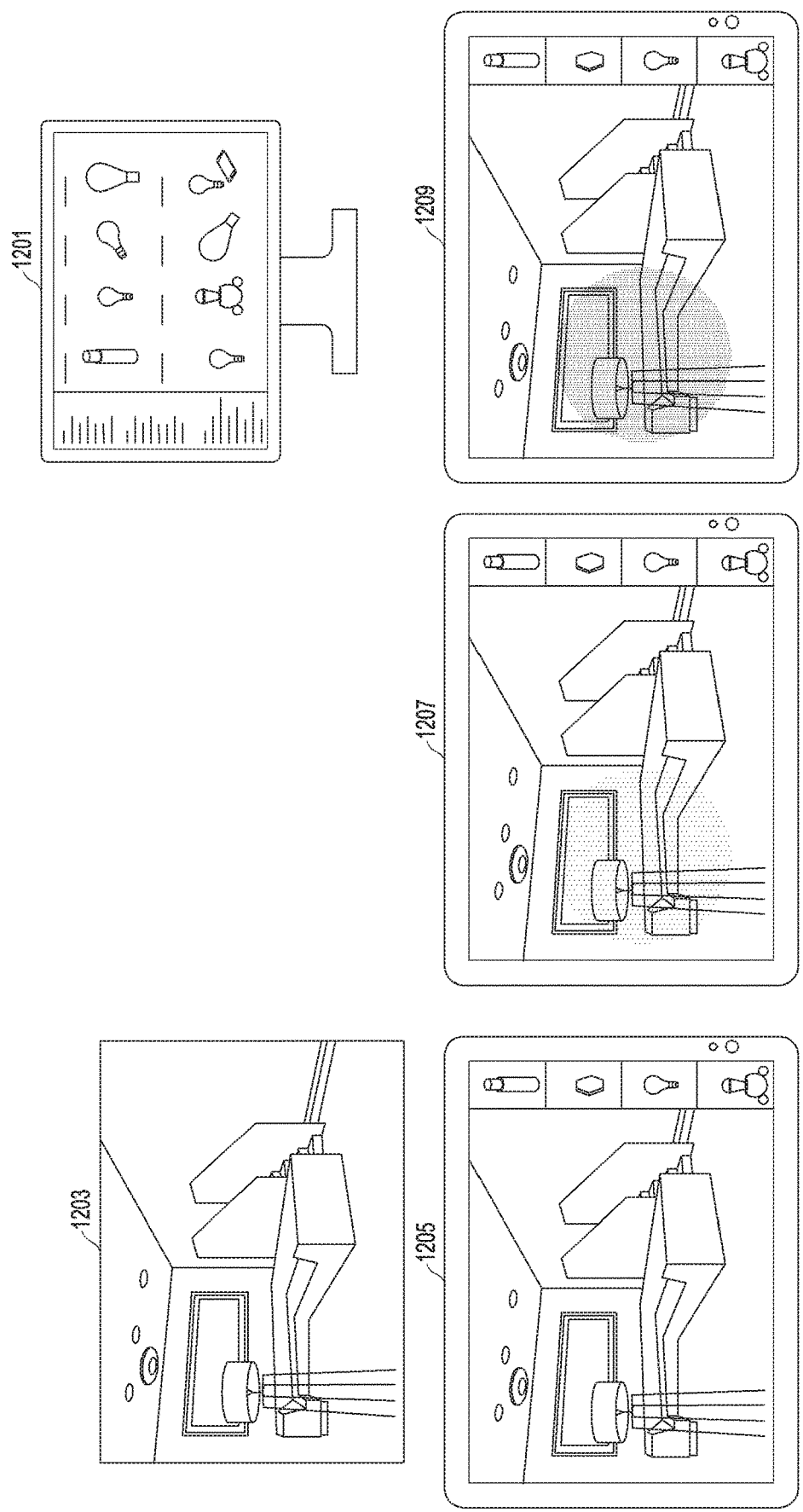
FIG. 12 is a diagram illustrating an example of applying an embodiment of the present disclosure to a bulb which is an IoT device.

FIG. 12 is a diagram illustrating an example of applying an embodiment of the present disclosure to a bulb which is an IoT device.

Reference numeral 1201 shows bulbs that a user wants to purchase on the Internet using a terminal, and reference numeral 1203 shows a space in which a bulb is installed. Reference numeral 1205 shows that the space 1203 is displayed to the user through the terminal. Reference numeral 1207 shows a form in which the light of a green bulb is emitted when the user selects the green bulb. Reference numeral 1209 shows a form in which the light of a red bulb is emitted when the user selects the red bulb. According to the embodiment of FIG. 12, the user can know the form of the light of a bulb before purchasing the bulb and thus can determine the optimum place for the bulb to be installed in the user's home. Further, the embodiment of FIG. 12 may be used to select lighting for an interior design of a space or to select stage lighting. For example, stage lighting exhibits various colors through mixing of various lights, and it is possible to know in advance what color results from mixing of various lights through the user's terminal according to the embodiment of FIG. 12.

Particular aspects of the present disclosure may be implemented as a computer-readable code in a computer-readable recording medium. The computer-readable recording medium is a predetermined data storage device which can store data which can be read by a computer system. The computer-readable recording medium may include a Read-Only Memory (ROM), a Random-Access Memory (RAM), CD-ROMs, magnetic tapes, floppy disks, optimal data storage devices, and carrier waves (such as data transmission through the Internet). The computer-readable recording medium may be distributed through computer systems connected to the network, and accordingly the computer-readable code is stored and executed in a distributed manner. Further, functional programs, codes, and code segments to achieve the present disclosure may be easily interpreted by programmers skilled in the art.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It will also be understood that a method and apparatus according to an embodiment of the present disclosure may be implemented by a computer or portable terminal including a controller and a memory, and the memory is an example of a machine readable device adapted to store a program or programs including instructions for implementing embodiments of the present disclosure.

Accordingly, the present disclosure includes a program including a code for implementing the apparatus or method described in any of the appended claims of the specification and a machine (computer or the like) readable storage medium for storing the program. Further, the program may be electronically carried by any medium such as a communication signal transferred through a wired or wireless connection, and the present disclosure appropriately includes equivalents thereof.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

The invention claimed is:

1. A method for managing a sensor in a terminal, the method comprising:
    generating a constituent image of a space in which the sensor is installed;
    obtaining a sensor identifier of the sensor on the basis of the constituent image;
    obtaining sensor information on the sensor corresponding to the sensor identifier;
    determining a detection area of the sensor on the basis of the constituent image and the sensor information; and
    displaying the determined detection area on the constituent image,
    wherein the method further comprises:
    determining whether to add a sensor to the space on the basis of the determined detection area of the sensor; and
    determining a position for the sensor to be added in the space on the basis of at least one of the sensor information and sensor influencer information, which is information on an object affecting the detection area of the sensor, in response to determining that the sensor is to be added to the space.

2. The method of claim 1, wherein the generating of the constituent image comprises:
    obtaining a space image by photographing a two-dimensional or three-dimensional space relating to the space; and
    generating the constituent image of the space using the obtained space image and position information on terminal.

3. The method of claim 2, wherein the obtaining of the sensor identifier comprises:
    identifying a sensor image from the space image; and
    obtaining the sensor identifier corresponding to the identified sensor image from a mapping table per sensor.

4. The method of claim 1, wherein the obtaining of the sensor information comprises:
    transmitting the sensor identifier to a server; and
    receiving the sensor information from the server.

5. The method of claim 4, wherein the obtaining of the sensor information further comprises receiving sensor influencer information, which is information on an object affecting the detection area of the sensor, and
    the sensor influencer information comprises list information on a sensor influencer, a detection influence coefficient that indicates influence degree to which the sensor influencer affect the sensor, and image information on the sensor influencer.

6. The method of claim 1, wherein the determining of the detection area of the sensor comprises:
    determining an initial detection area on the basis of a detection range and a detection angle of the sensor comprised in the sensor information; and
    determining a final detection area on the basis of the determined initial detection area and the constituent image.

7. The method of claim 6, wherein the determining of the final detection area comprises:
    determining a calibration value on the basis of an influence function per distance comprised in the sensor information and the detection influence coefficient comprised in the sensor influencer information; and
    calibrating the determined initial detection area by the determined calibration value.

8. The method of claim 1, wherein the determining of the position for the sensor to be added comprises:
    determining an initial position for the sensor to be added by a predetermined method;
    determining a calibration value for the determined initial position; and
    determining a final position for the sensor to be added by calibrating the determined initial position by the determined calibration value.

9. The method of claim 8, wherein the determining of the calibration value comprises:
    obtaining an initial calibration value on the basis of an influence function per distance ($f(x)$) comprised in the sensor information and the detection influence coefficient ($Y$) comprised in the sensor influencer information; and
    determining the initial calibration value as the calibration value.

10. A terminal for managing a sensor, the terminal comprising:
    a controller configured to generate a constituent image of a space in which the sensor is installed, to obtain a sensor identifier of the sensor on the basis of the constituent image, to obtain sensor information on the sensor corresponding to the sensor identifier, and to determine a detection area of the sensor on the basis of the constituent image and the sensor information; and
    a display configured to display the determined detection area on the constituent image,
    wherein the controller is further configured to determine whether to add a sensor to the space on the basis of the determined detection area of the sensor and to determine a position for the sensor to be added in the space on the basis of at least one of the sensor information and sensor influencer information, which is information on an object affecting the detection area of the sensor, in response to determining that the sensor is to be added to the space.

11. The terminal of claim 10, wherein the control unit is configured to obtain a space image by photographing a two-dimensional or three-dimensional space relating to the space; and to generate the constituent image of the space using the obtained space image and position information on the terminal.

12. The terminal of claim 11, wherein the control unit is configured to identify a sensor image from the space image; and to obtain the sensor identifier corresponding to the identified sensor image from a mapping table per sensor.

13. The terminal of claim 10, wherein the control unit is configured to transmit the sensor identifier to a server; and to receive the sensor information from the server.

14. The terminal of claim 13, wherein the control unit is configured to obtain of the sensor information further comprises receiving sensor influencer information, which is information on an object affecting the detection area of the sensor, and the sensor influencer information comprises list information on a sensor influencer, a detection influence coefficient that indicates influence degree to which the sensor influencer affect the sensor, and image information on the sensor influencer.

15. The terminal of claim 10, wherein the control unit is configured to determine an initial detection area on the basis of a detection range and a detection angle of the sensor comprised in the sensor information; and to determine a final detection area on the basis of the determined initial detection area and the constituent image.

16. The terminal of claim 15, wherein the control unit is configured to determine a calibration value on the basis of an influence function per distance comprised in the sensor information and the detection influence coefficient comprised in the sensor influencer information; and to calibrate the determined initial detection area by the determined calibration value.

17. The terminal of claim 10, wherein the controller is configured to determine an initial position for the sensor to be added by a predetermined method; to determine a calibration value for the determined initial position; and to determine a final position for the sensor to be added by calibrating the determined initial position by the determined calibration value.

18. The terminal of claim 17, wherein the controller is configured to obtain an initial calibration value on the basis of an influence function per distance ($f(x)$) comprised in the sensor information and the detection influence coefficient ($Y$) comprised in the sensor influencer information; and to determine the initial calibration value as the calibration value.

* * * * *